US011016907B2

(12) United States Patent
Bradbury et al.

(10) Patent No.: US 11,016,907 B2
(45) Date of Patent: *May 25, 2021

(54) INCREASING THE SCOPE OF LOCAL PURGES OF STRUCTURES ASSOCIATED WITH ADDRESS TRANSLATION

(71) Applicant: INTERNATIONAL BUSINESS MACHINES CORPORATION, Armonk, NY (US)

(72) Inventors: Jonathan D. Bradbury, Poughkeepsie, NY (US); Fadi Y. Busaba, Poughkeepsie, NY (US); Lisa Cranton Heller, Rhinebeck, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,556

(22) Filed: Aug. 16, 2019

(65) Prior Publication Data
US 2019/0370184 A1 Dec. 5, 2019

Related U.S. Application Data

(63) Continuation of application No. 16/212,900, filed on Dec. 7, 2018, now Pat. No. 10,572,392, which is a
(Continued)

(51) Int. Cl.
*G06F 12/1027* (2016.01)
*G06F 12/1009* (2016.01)
(Continued)

(52) U.S. Cl.
CPC ...... *G06F 12/1027* (2013.01); *G06F 12/1009* (2013.01); *G06F 12/121* (2013.01);
(Continued)

(58) Field of Classification Search
CPC .. G06F 12/1027; G06F 12/10; G06F 12/1009; G06F 2212/1016;
(Continued)

(56) References Cited

U.S. PATENT DOCUMENTS 4,068,303 A 1/1978 Morita
4,456,954 A 7/1984 Bullions, III et al.
(Continued)

FOREIGN PATENT DOCUMENTS

EP 000067344 A2 12/1982
EP 0145960 A2 6/1985
(Continued)

OTHER PUBLICATIONS

Alkassar, Eyad, et al., "Automated Verification of a Small Hypervisor," Third International Conference, VSTTE 2010, Edinburgh, UK, Aug. 2010. pp. 41-54.
(Continued)

*Primary Examiner* — Zhuo H Li
(74) *Attorney, Agent, or Firm* — Steven Chiu, Esq.; Blanche E. Schiller, Esq.; Heslin Rothenberg Farley & Mesiti P.C.

(57) ABSTRACT

Increasing the scope of local purges of structures associated with address translation. A hardware thread of a physical core of a machine configuration issues a purge request. A determination is made as to whether the purge request is a local request. Based on the purge request being a local request, entries of a structure associated with address translation are purged on at least multiple hardware threads of a set of hardware threads of the machine configuration.

20 Claims, 18 Drawing Sheets

Related U.S. Application Data continuation of application No. 15/212,546, filed on Jul. 18, 2016, now Pat. No. 10,223,281.

(51) Int. Cl.
*G06F 12/121* (2016.01)
*G06F 12/12* (2016.01)

(52) U.S. Cl.
CPC ........ *G06F 12/12* (2013.01); *G06F 2212/657* (2013.01); *G06F 2212/68* (2013.01)

(58) Field of Classification Search
CPC ......... G06F 2212/682; G06F 2212/657; G06F 12/121; G06F 2212/68; G06F 2212/62; G06F 2212/69; Y02D 10/13; Y02D 10/14
See application file for complete search history.

(56) References Cited

U.S. PATENT DOCUMENTS

| | | | |
|---|---|---|---|
| 4,525,778 A | 6/1985 | Cane | |
| 4,733,350 A | 3/1988 | Tone | |
| 4,779,188 A | 10/1988 | Gum et al. | |
| 4,821,171 A | 4/1989 | Calamari | |
| 5,073,851 A | 12/1991 | Masterson | |
| 5,317,705 A | 5/1994 | Gannon et al. | |
| 5,317,754 A | 5/1994 | Blandy | |
| 5,428,757 A | 6/1995 | Sutton | |
| 5,491,806 A | 2/1996 | Horstmann et al. | |
| 5,574,878 A | 11/1996 | Onodera | |
| 5,896,520 A | 4/1999 | Ohminato et al. | |
| 5,940,872 A | 8/1999 | Hammond et al. | |
| 5,978,892 A | 11/1999 | Noel | |
| 6,079,013 A | 6/2000 | Webb | |
| 6,263,403 B1 * | 7/2001 | Traynor | G06F 12/0815 711/121 |
| 6,332,163 B1 | 12/2001 | Bowman-Amuah | |
| 6,430,667 B1 | 8/2002 | Leon | |
| 6,604,187 B1 | 8/2003 | McGrath et al. | |
| 6,631,447 B1 * | 10/2003 | Morioka | G06F 12/0826 711/141 |
| 6,961,806 B1 | 11/2005 | Agesen | |
| 7,114,054 B2 | 9/2006 | Greer | |
| 7,117,338 B2 | 10/2006 | Brewer | |
| 7,197,585 B2 | 3/2007 | Farrell et al. | |
| 7,206,915 B2 | 4/2007 | DeSouter et al. | |
| 7,284,100 B2 | 10/2007 | Slegel et al. | |
| 7,296,139 B1 | 11/2007 | Case et al. | |
| 7,296,265 B1 | 11/2007 | Krishnan et al. | |
| 7,299,337 B2 | 11/2007 | Traut et al. | |
| 7,334,108 B1 | 2/2008 | Case et al. | |
| 7,363,463 B2 | 4/2008 | Sheu et al. | |
| 7,376,949 B2 | 5/2008 | Lowell et al. | |
| 7,409,487 B1 | 8/2008 | Chen et al. | |
| 7,454,590 B2 | 11/2008 | Jordan et al. | |
| 7,509,475 B2 | 3/2009 | Shinohara et al. | |
| 7,543,291 B2 | 6/2009 | Lesartr et al. | |
| 7,562,179 B2 | 7/2009 | Brandt et al. | |
| 7,624,240 B1 | 11/2009 | Colbert | |
| 7,636,831 B1 | 12/2009 | Subrahmanyam | |
| 7,650,482 B2 | 1/2010 | Traut et al. | |
| 7,657,659 B1 | 2/2010 | Lambeth | |
| 7,661,102 B2 | 2/2010 | Ogle | |
| 7,734,892 B1 | 6/2010 | Rozas et al. | |
| 7,814,287 B2 | 10/2010 | Pratt | |
| 7,836,275 B2 | 11/2010 | Anderson et al. | |
| 7,865,670 B2 | 1/2011 | Cota-Robles et al. | |
| 7,941,799 B2 | 5/2011 | Easton et al. | |
| 8,015,388 B1 | 9/2011 | Rihan et al. | |
| 8,032,716 B2 | 10/2011 | Heller et al. | |
| 8,095,771 B2 | 1/2012 | Sheu et al. | |
| 8,127,098 B1 | 2/2012 | Klaiber et al. | |
| 8,151,085 B2 | 4/2012 | Deutschle et al. | |
| 8,166,239 B2 | 4/2012 | Fertig et al. | |
| 8,301,863 B2 | 10/2012 | Hall et al. | |
| 8,307,191 B1 | 11/2012 | Jain | |
| 8,380,907 B2 | 2/2013 | Heller et al. | |
| 8,387,049 B2 | 2/2013 | Adlung et al. | |
| 8,397,050 B2 | 3/2013 | Chang et al. | |
| 8,438,363 B1 | 5/2013 | Koryakin et al. | |
| 8,452,942 B2 | 5/2013 | Slegel et al. | |
| 8,490,085 B2 | 7/2013 | Devaux | |
| 8,738,932 B2 | 5/2014 | Lee et al. | |
| 8,745,356 B2 | 6/2014 | Maruyama | |
| 8,930,635 B2 | 1/2015 | Woffinden | |
| 8,954,709 B2 | 2/2015 | Nishiguchi et al. | |
| 9,069,715 B2 | 5/2015 | Deutschle et al. | |
| 9,075,721 B2 | 7/2015 | Tamura | |
| 9,081,707 B2 | 7/2015 | Conrad et al. | |
| 9,086,989 B2 | 7/2015 | Gupta et al. | |
| 9,092,382 B2 | 7/2015 | Deutschle et al. | |
| 9,182,984 B2 | 11/2015 | Greiner et al. | |
| 9,330,018 B2 | 5/2016 | Duetschle et al. | |
| 9,697,135 B2 | 7/2017 | Deutschle et al. | |
| 9,798,597 B1 | 10/2017 | Duale et al. | |
| 9,858,198 B2 | 1/2018 | Seiler | |
| 10,162,764 B2 | 12/2018 | Bradbury | |
| 10,168,902 B2 | 1/2019 | Bradbury | |
| 10,169,243 B2 | 1/2019 | Bradbury | |
| 10,176,006 B2 | 1/2019 | Heller | |
| 10,176,110 B2 | 1/2019 | Bradbury | |
| 10,176,111 B2 | 1/2019 | Bradbury | |
| 10,180,909 B2 | 1/2019 | Bradbury | |
| 10,180,910 B2 | 1/2019 | Bradbury | |
| 10,223,281 B2 * | 3/2019 | Bradbury | G06F 12/1027 |
| 10,241,924 B2 | 3/2019 | Bradbury | |
| 10,248,573 B2 | 4/2019 | Bradbury | |
| 10,282,305 B2 | 5/2019 | Borntraeger | |
| 10,572,392 B2 * | 2/2020 | Bradbury | G06F 12/1009 |
| 2002/0144079 A1 | 10/2002 | Willis et al. | |
| 2004/0064618 A1 | 4/2004 | Farrell et al. | |
| 2004/0117593 A1 | 6/2004 | Uhlig et al. | |
| 2004/0225765 A1 | 11/2004 | Greer | |
| 2006/0259734 A1 | 11/2006 | Sheu et al. | |
| 2006/0294288 A1 | 12/2006 | Seth | |
| 2007/0016904 A1 | 1/2007 | Adlung et al. | |
| 2007/0050594 A1 | 3/2007 | Augsburg | |
| 2007/0112999 A1 | 5/2007 | Oney | |
| 2008/0016315 A1 | 1/2008 | Cohen | |
| 2008/0133875 A1 | 6/2008 | Cohen | |
| 2008/0155168 A1 | 6/2008 | Sheu | |
| 2008/0201540 A1 | 8/2008 | Sahita et al. | |
| 2008/0320216 A1 | 12/2008 | Fertig et al. | |
| 2009/0013149 A1 | 1/2009 | Uhlig et al. | |
| 2009/0158004 A1 | 6/2009 | Hasegaw et al. | |
| 2009/0172341 A1 | 7/2009 | Durham | |
| 2009/0216928 A1 | 8/2009 | Heller et al. | |
| 2009/0216984 A1 | 8/2009 | Gainey et al. | |
| 2010/0074146 A1 | 3/2010 | Banks | |
| 2010/0161934 A1 | 6/2010 | Alvarez | |
| 2010/0250895 A1 | 9/2010 | Adams | |
| 2010/0274987 A1 | 10/2010 | Subrahmanyam et al. | |
| 2010/0332786 A1 | 12/2010 | Grohoski et al. | |
| 2011/0082962 A1 | 4/2011 | Horovitz et al. | |
| 2011/0320755 A1 | 12/2011 | Blake et al. | |
| 2012/0017039 A1 | 1/2012 | Margetts | |
| 2012/0246387 A1 | 9/2012 | Kanno | |
| 2012/0331266 A1 | 12/2012 | Anraku | |
| 2013/0042066 A1 | 2/2013 | Price | |
| 2013/0246605 A1 | 9/2013 | Mahadik et al. | |
| 2013/0339655 A1 | 12/2013 | Hom et al. | |
| 2013/0339656 A1 | 12/2013 | Greiner et al. | |
| 2013/0339657 A1 | 12/2013 | Greiner et al. | |
| 2014/0047456 A1 | 2/2014 | Haba | |
| 2014/0095840 A1 | 4/2014 | Heller | |
| 2014/0101401 A1 | 4/2014 | Mulcahy et al. | |
| 2014/0129798 A1 | 5/2014 | Deutschle et al. | |
| 2014/0129800 A1 | 5/2014 | Deutschle et al. | |
| 2014/0230077 A1 | 8/2014 | Muff et al. | |
| 2014/0325167 A1 | 10/2014 | Slegel et al. | |
| 2014/0331224 A1 | 11/2014 | Robenko et al. | |
| 2015/0058522 A1 | 2/2015 | Armstrong et al. | |
| 2015/0058580 A1 | 2/2015 | Lagar Cavilla | |
| 2015/0089116 A1 | 3/2015 | Chin et al. | |

(56) References Cited

U.S. PATENT DOCUMENTS

| | | |
|---|---|---|
| 2015/0100748 A1 | 4/2015 | Farrell et al. |
| 2015/0106599 A1 | 4/2015 | Gainey, Jr. et al. |
| 2015/0120985 A1 | 4/2015 | Frey et al. |
| 2015/0149997 A1 | 5/2015 | Tsirkin et al. |
| 2015/0161056 A1 | 6/2015 | DeGuillard et al. |
| 2015/0242227 A1 | 8/2015 | Nair |
| 2015/0269085 A1 | 9/2015 | Gainey |
| 2015/0331802 A1 | 11/2015 | Cain, III et al. |
| 2015/0370592 A1 | 12/2015 | Tuch et al. |
| 2016/0292082 A1 | 10/2016 | Craddock et al. |
| 2017/0003964 A1 | 1/2017 | Bartik et al. |
| 2017/0024326 A1 | 1/2017 | Luo |
| 2017/0123996 A1 | 5/2017 | Kishan |
| 2017/0249261 A1 | 8/2017 | Durham |
| 2017/0371695 A1 | 12/2017 | Sanjeepan |
| 2018/0018281 A1 | 1/2018 | Bradbury et al. |
| 2018/0018283 A1 | 1/2018 | Borntraeger et al. |
| 2018/0018284 A1 | 1/2018 | Borntraeger et al. |
| 2018/0052777 A1 | 2/2018 | Bradbury et al. |
| 2018/0067868 A1 | 3/2018 | Bradbury et al. |
| 2019/0108135 A1 | 4/2019 | Bradbury |

FOREIGN PATENT DOCUMENTS

| | | |
|---|---|---|
| EP | 002248025 B1 | 3/2012 |
| EP | 2862059 | 4/2015 |
| JP | S61156445 A | 7/1986 |
| JP | 4769308 | 9/2011 |
| KR | 101287448 B1 | 7/2013 |
| TW | 201413454 | 4/2014 |
| WO | WO2006039057 A3 | 4/2006 |
| WO | WO2013101378 A1 | 7/2013 |
| WO | WO2014036004 A1 | 3/2014 |
| WO | WO2015009318 A1 | 1/2015 |
| WO | WO2015145620 A1 | 1/2015 |

OTHER PUBLICATIONS

Arya, K., et al., "Tesseract: Reconciling Guest I/O and Hypervisor Swapping in a VM," ACM SIGPLAN Notices, 49(7), Mar. 2014, pp. 15-28.

Axnix, C. et al., "IBM z13 Firmware Innovations for Simultaneous Multithreading and I/O Virtualization," IBM Journal of Research and Development, vol. 59, No. 4/5, Paper 11, Jul./Sep. 2015, pp. 11:1-11:11.

Caraman, Mihai, "Patchwork KVM: PPC: e500mc: Relax TLB Invalidation Condition on VCPU Schedule," Jun. 2014, pp. 1-9.

Coscarella, et al., "System for Purging TLB," IP.com No. 000052724, Feb. 2005, pp. 1-2 (+ cover).

Frey, B.G., & Mueller, M.J., "Translation Lookaside Buffer Castout Queue," IP.com No. IPCOM000120766D, Apr. 2, 2005, pp. 106-107 (+ cover).

IBM, "Power ISA V2.07B", Apr. 9, 2015, pp. 1-1527.

IBM, "System /370 Extended Architecture/Interpretive Execution," IBM Publication No. SA22-7095-01, Sep. 1985, pp. 1-32.

IBM, "z/Architecture—Principles of Operation," IBM Publication No. SA22-7832-10, 11$^{th}$ Edition, Mar. 2015, pp. 1-1732.

IBM, "z/VM: Running Guest Operating Systems," IBM® Publication No. SC24-5997-02, Oct. 2001, pp. 1-179.

IPCOM000128917, IBM, "IBM System/370 Systems Principles of Operation," IP.com No. 000128917, pp. 1-356 (+ cover).

IPCOM000146587D, Anonymous, "An Efficient TLB Virtualization Algorithm Using Machine Contiguous Page Information in a Virtualization Environment," Feb. 16, 2017, pp. 1-4.

IPCOM000192722D, MIHM, Thomas, Jr., et al., "Four Reasons Your Next Mobile Product Should have a Hypervisor," Feb. 2010, pp. 1-8.

IPCOM000222815D, Anonymous, "Multi-Level Nested Translation Lookaside Buffers," Oct. 23, 2012, p. 1 (+ cover).

Kerrigan, et al., "Table Lookaside Buffer with Selective Space Invalidation," IP.com No. 000087098, Mar. 2005, p. 1 (+ cover).

Mel, Peter and Tim Grance, "The NIST Definition of Cloud Computing," National Institute of Standards and Technology, Information Technology Laboratory, Special Publication 800-145, Sep. 2011, pp. 1-7.

Nordholz, Jan et al., "XNPro: Low-Impact Hypervisor-Based Execution Prevention on ARM," TrustED, Oct. 2015, pp. 55-64.

Osisek, et al., "ESA/390 interpretive-execution architecture, foundation for VM/ESA," IBM Systems Journal, vol. 30, No. 1, Jan. 1991, pp. 34-51.

Samanta, et al., "Dynamic Aggregation of Virtual Addresses in TLB using TCAM Cells," 21$^{st}$ International Conference on VLSI Design, Jan. 2008, pp. 243-248.

Schwarz, et al., "The Microarchitecture of the IBM eServer z900 Processor," IBM Journal of Research and Development 46, No. 4, Jul. 2002, pp. 381-395.

Sobania, Jan-Arne et al., "Towards Symmetric Multi-Processing Support for Operating Systems on the SCC," 4$^{th}$ MARC Symposium, Dec. 2011, pp. 73-78.

Vahidi, A. et al., "VETE: Virtualizing the Trusted Execution Environment," SICS Technical Report T2013:02, Mar. 2013, pp. 1-35.

Venkatasubramanian, et al., "TMT—A TLB Tag Management Framework for Virtualized Platforms," 21$^{st}$ Annual Symposium on Computer Architecture and High Performance Computing, Oct. 2009, pp. 153-160.

Whang, Z., et al., "Hypersafe: A Lightweight Approach to Provide Lifetime Hypervisor Control-Flow Integrity," 2010 IEEE Symposium on Security and Privacy, May 2010, pp. 380-395.

Yu, Cong et al., "Protecting the Security and Privacy of the Virtual Machine through Privilege Separation," Proceedings of the 2$^{nd}$ International Conference on Computer Science and Electronics Engineering, 2013 (no further date information available), pp. 2224-2228.

List of IBM Patents or Patent Applications Treated as Related, Oct. 2017, pp. 1-2.

IBM, "PJ40387: Provide Local IPTE Support," Oct. 2012, http://www.01.ibm.com/support/docview.wss?uid=swgIPJ40387, pp. 1-7.

Brown et al., Fundamentals of Digital Logic with Verilog Design, Jul. 2002, pp. 367-368 (+ cover).

IBM, "z/Architecture—Principles of Operation," SA22-7832-10, Eleventh Edition, Mar. 2015, pp. 10-36 thru 10-39 (+ cover).

Bradbury, et al., "Increasing The Scope of Local Purges of Structures Associated With Address Translation," U.S. Appl. No. 16/542,556, filed Aug. 16, 2019, pp. 1-69.

List of IBM Patents or Patent Applications Treated as Related, Dec. 2, 2019, pp. 1-2.

\* cited by examiner

INCREASING THE SCOPE OF LOCAL PURGES OF STRUCTURES ASSOCIATED WITH ADDRESS TRANSLATION

This application is a continuation of co-pending U.S. patent application Ser. No. 16/212,900, filed Dec. 7, 2018, entitled "INCREASING THE SCOPE OF LOCAL PURGES OF STRUCTURES ASSOCIATED WITH ADDRESS TRANSLATION," which is a continuation of U.S. Pat. No. 10,223,281, issued Mar. 5, 2019, entitled "INCREASING THE SCOPE OF LOCAL PURGES OF STRUCTURES ASSOCIATED WITH ADDRESS TRANSLATION," each of which is hereby incorporated herein by reference in its entirety.

BACKGROUND

One or more aspects relate, in general, to processing within a computing environment, and in particular, to processing associated with address translation data structures of a virtual environment.

In computing environments that support virtualization technology, an operating system may be running on a virtual machine on a processor that supports multiple levels of address translation tables. In such an environment, the operating system is a guest of a hypervisor also executing in the computing environment.

Further, in such environments, dynamic address translation (DAT) may be performed during a memory reference to translate a virtual address into a corresponding real or absolute address. This translation typically includes a walk, referred to as a page or DAT walk, of multiple levels of address translation tables in order to determine the real address. This is time consuming, and thus, to improve performance for future translation requests, the virtual address to real or absolute address mapping is stored in an entry of a structure associated with address translation, such as a translation look-aside buffer (TLB) or other such structure.

The translation look-aside buffer is a cache used by the memory management hardware to improve virtual address translation speed. The next time translation for a virtual address is requested, the TLB is checked. If the translation is in the TLB, the real or absolute address is retrieved from the TLB. Otherwise, the DAT walk is performed once again.

At times, it is necessary to purge some or all of the TLB entries used by a particular processor. Managing this purging is a complex task and may negatively affect system performance.

SUMMARY

Shortcomings of the prior art are overcome and additional advantages are provided through the provision of a computer program product for facilitating processing in a computing environment. The computer program product includes a storage medium readable by a processing circuit and storing instructions for performing a method. The method includes issuing, by a hardware thread of a physical core of a machine configuration, a purge request, and determining whether the purge request is a local request. Based on the purge request being a local request, one or more entries of a structure associated with address translation are purged on at least multiple hardware threads of a set of hardware threads of the machine configuration. This increases the scope of local purging, and may decrease overall purging, thereby increasing system performance.

In one example, the purging the one or more entries of the structure associated with address translation includes purging one or more entries of the structure associated with address translation associated with a particular page of memory specified by the purge request. As an example, the structure associated with address translation is a translation look-aside buffer.

In one example, the issuing the purge request includes issuing an invalidate instruction, the invalidate instruction indicating the purge request. As examples, the invalidation instruction includes an instruction selected from the group consisting of: an invalidate page table entry instruction, an invalidate dynamic address translation table entry instruction, and a compare and replace dynamic address translation table entry instruction.

In one example, the method further includes checking, based on the purge request being a local request, whether a purge has already been performed on the hardware threads of the set of hardware threads except for the hardware thread issuing the purge request, and performing the purging, based on the checking indicating the purge has not already been performed.

Further, the method may include determining, based on performing the purging, whether the purge request is a request to purge specific guest entries, and setting a purge done indicator based on the purge request not being a request to purge specific guest entries.

In one example, the method further includes entering, by the hardware thread, Start Interpretative Execution (SIE) on the physical core, and determining, based on entering SIE, whether a guest executing on the hardware thread last ran on a thread within the set of threads. Based on determining the guest last ran on a thread within the set of threads, refraining from purging guest entries of the structure associated with address translation.

Moreover, in one example, based on determining the guest did not last run on a thread within the set of threads, purge guest entries of the structure associated with address translation on threads of the set of threads, and set a purge done indicator.

The purging on the at least multiple threads reduces purging to be performed on Start Interpretative Execution entry of the hardware thread.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In computing environments that support virtual memory, a memory management technique, referred to as paging, is used to retrieve blocks of memory (e.g., pages) from secondary storage to be used in main memory. Further, due to physical memory constraints, chosen blocks of memory may be returned (i.e., paged-out) to secondary storage.

As a result of paging-out blocks of memory, address translation structure entries (e.g., page table entries, region table entries and/or segment table entries) associated with the blocks of memory being paged-out may be invalidated. Additionally, corresponding entries of structures associated with address translation (e.g., translation look-aside buffer entries) may be purged.

In accordance with an aspect of the present invention, a capability is provided to increase the scope of local purges of structures associated with address translation, such as translation look-aside buffers. By increasing the scope of local purges in one aspect, purges at other times, such as on Start Interpretative Execution entry, are decreased. Further, the number of entries to be purged on SIE entry may also be decreased. The decreasing of these purges enables overall purging to be decreased and allows system performance to be increased.

Figure 1:
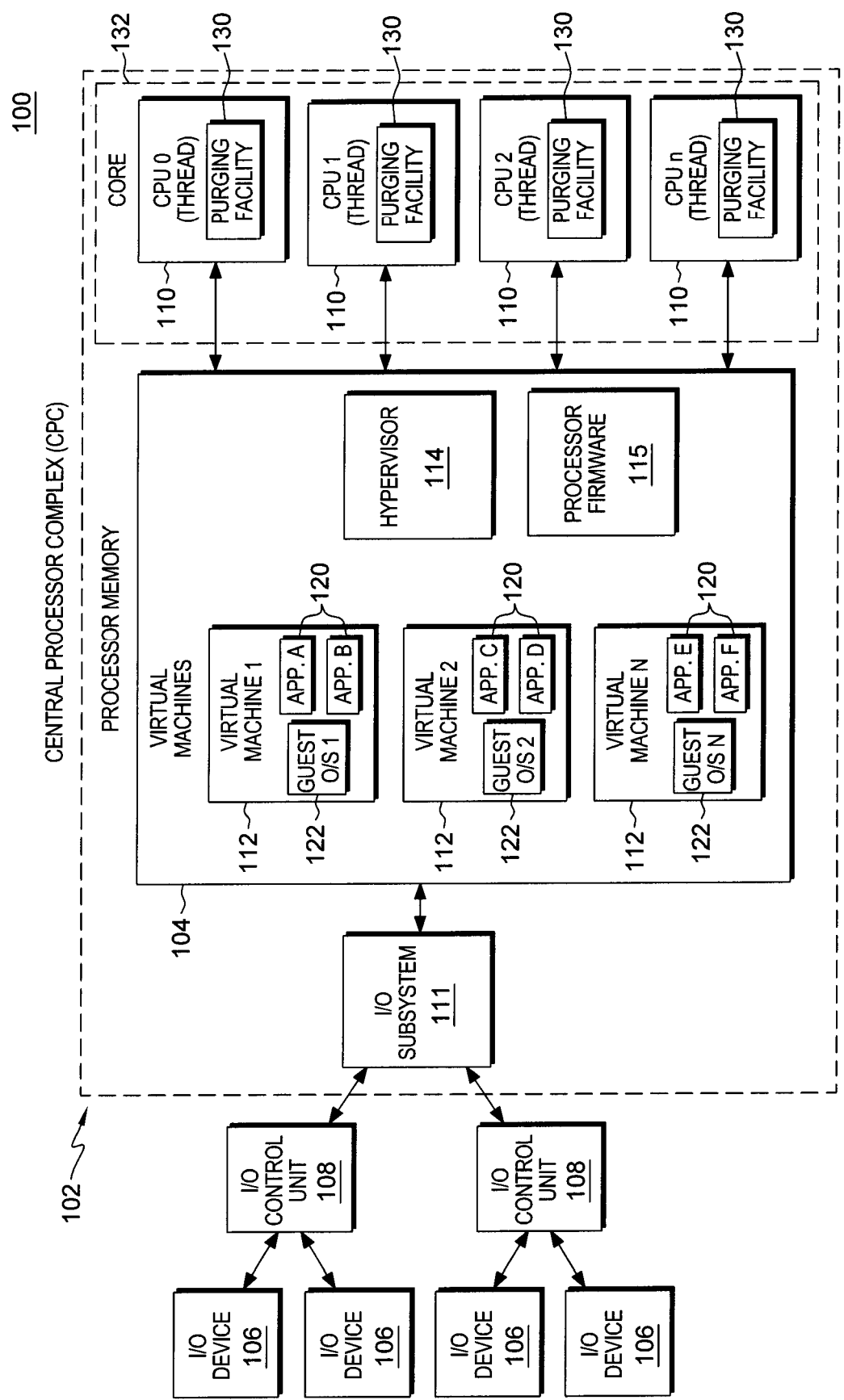
FIG. 1 depicts one example of a virtual computing environment to incorporate and use one or more aspects of a purging facility, in accordance with an aspect of the present invention.

One example of a computing environment to incorporate and use one or more aspects of a purging facility is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-10, 11$^{th}$ Edition, March 2015, which is hereby incorporated by reference herein in its entirety. Z/ARCHITECTURE, IBM, Z/VM and Z/OS (referenced herein) are registered trademarks of International Business Machines Corporation, Armonk, N.Y. Other names used herein may be registered trademarks, trademarks or product names of International Business Machines Corporation or other companies.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

Computing environment 100 includes a central processor complex (CPC) 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114, that manages the virtual machines, and processor firmware 115. One example of hypervisor 114 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 120 and running a guest operating system 122, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine. In one embodiment, central processor 110 includes a purging facility 130 used, as described herein, to purge entries in structures associated with address translation.

Additionally, in one embodiment, each CPU 110 is a hardware thread executing within a processing core (a.k.a., core) 132. A core includes one or more threads, and in this example, core 132 includes four hardware threads. In other examples, the computing environment may include one or more cores, and each core may include one or more hardware threads.

Further, processor memory 104 is coupled to an I/O subsystem 111. Input/output subsystem 111 directs the flow of information between input/output control units 108 and devices 106 and main storage 104. It is coupled to the central processing complex, in that it can be a part of the central processing complex or separate therefrom.

In this particular example, the model of virtual machines is a V=V model, in which the real or absolute memory of a virtual machine is backed by host virtual memory, instead of real or absolute memory. Each virtual machine has a contiguous virtual memory space. The physical resources are managed by host 114, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests.

In one embodiment, the host (e.g., z/VM®) and processor (e.g., System z) hardware/firmware interact with each other in a controlled cooperative manner in order to process guest operating system operations without requiring the transfer of control from/to the guest operating system and the host. Guest operations can be executed directly without host intervention via a facility that allows instructions to be interpretively executed for the guest, including a pageable storage mode guest. This facility provides an instruction, Start Interpretive Execution (SIE), which the host can issue, designating a control block called a state description which holds guest (virtual machine) state and controls, such as execution controls and mode controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception.

Figure 2A:
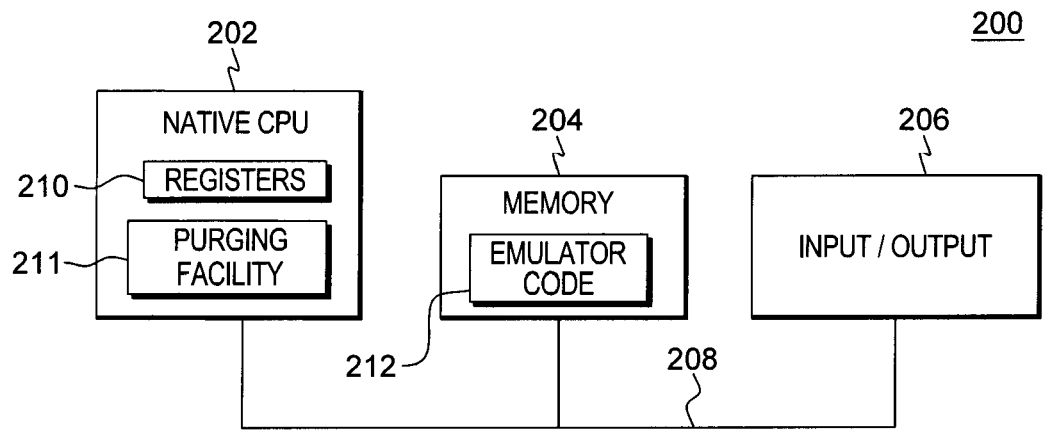
FIG. 2A depicts another example of a computing environment to incorporate and use one or more aspects of a purging facility, in accordance with an aspect of the present invention.

Another example of a computing environment to incorporate and use one or more aspects of the purging facility is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment, as well as a purging facility 211. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and to execute software and instructions developed based on the z/Architecture.

Figure 2B:
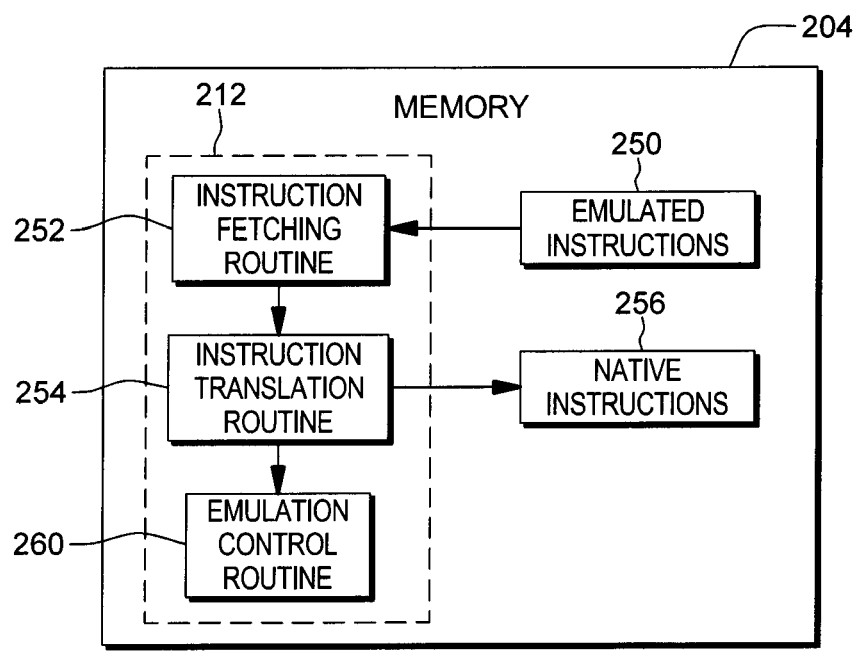
FIG. 2B depicts further details of the memory of FIG. 2A.

Further details relating to emulator code 212 are described with reference to FIG. 2B. Emulated instructions 250 stored in memory 204 comprise software instructions (e.g., correlating to machine instructions) that were developed to be executed in an architecture other than that of native CPU 202. For example, emulated instructions 250 may have been designed to execute on a z/Architecture processor, but instead, are being emulated on native CPU 202, which may be, for example, an Intel Itanium II processor. In one example, emulator code 212 includes an instruction fetching routine 252 to obtain one or more emulated instructions 250 from memory 204, and to optionally provide local buffering for the instructions obtained. It also includes an instruction translation routine 254 to determine the type of emulated instruction that has been obtained and to translate the emulated instruction into one or more corresponding native instructions 256. This translation includes, for instance, identifying the function to be performed by the emulated instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, emulated instructions 250, native instructions 256 and emulator code 212 may reside in the same memory or may be disbursed among different memory devices.

The computing environments described herein support architectural functions, such as dynamic address translation (DAT). With appropriate support by an operating system, the dynamic address translation facility may be used to provide to a user a system in which storage appears to be larger than the main storage (a.k.a., main memory) which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage (e.g., storage not directly addressable). The virtual storage is considered to be composed of blocks of addresses, called pages. Only the most recently referred to pages of the virtual storage are assigned to occupy blocks of physical main storage (e.g., random access memory (RAM)). As the user refers to pages of virtual storage that do not appear in main storage, they are brought in to replace pages in main storage that are less likely to be needed. The swapping of pages of storage may be performed by the operating system without the user's knowledge.

Moreover, in virtual computing environments, the interpretative execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment may call for application of DAT multiple times: first at the guest level, to translate a guest virtual address through guest managed translation tables into a guest real address, and then, for a pageable guest, at the host level, to translate the corresponding host virtual address to a host real address.

A sequence of virtual addresses associated with virtual storage is called an address space, and the dynamic address translation facility may be used to provide a number of address spaces. These address spaces may be used to provide degrees of isolation between users. Such support can include a completely different address space for each user, thus providing complete isolation, or a shared area may be provided by mapping a portion of each address space to a single common storage area. Also instructions are provided which permit a semi-privileged program to access more than one such address space. Dynamic address translation provides for the translation of, for instance, virtual addresses from multiple different address spaces without requiring that the translation parameters in the control registers be changed.

Dynamic address translation is the process of translating a virtual address during a storage reference into the corresponding real or absolute address. Dynamic address translation may be specified for instruction and data addresses generated by the CPU. The real or absolute address that is formed by dynamic address translation, and the absolute address that is then formed by prefixing, in one embodiment, are 64 bits in length. The virtual address may be a primary virtual address, a secondary virtual address, an access register (AR)-specified virtual address, or a home virtual address. The addresses are translated by means of the primary, the secondary, an AR-specified, or the home address space control element (ASCE), respectively. After selection of the appropriate address space control element, the translation process is the same for all of the four types of virtual addresses. An address space control element may be a segment table designation or a region table designation. A segment table designation or region table designation causes translation to be performed by means of tables established by the operating system in real or absolute storage.

In the process of translation when using a segment table designation or a region table designation, three types of units of information are recognized—regions, segments, and pages. The virtual address, accordingly, is divided into four fields. In one example, bits 0-32 are called the region index (RX), bits 33-43 are called the segment index (SX), bits 44-51 are called the page index (PX), and bits 52-63 are called the byte index (BX). The RX part of a virtual address is itself divided into three fields. Bits 0-10 are called the region first index (RFX), bits 11-21 are called the region second index (RSX), and bits 22-32 are called the region third index (RTX), in one embodiment.

Figure 3A:
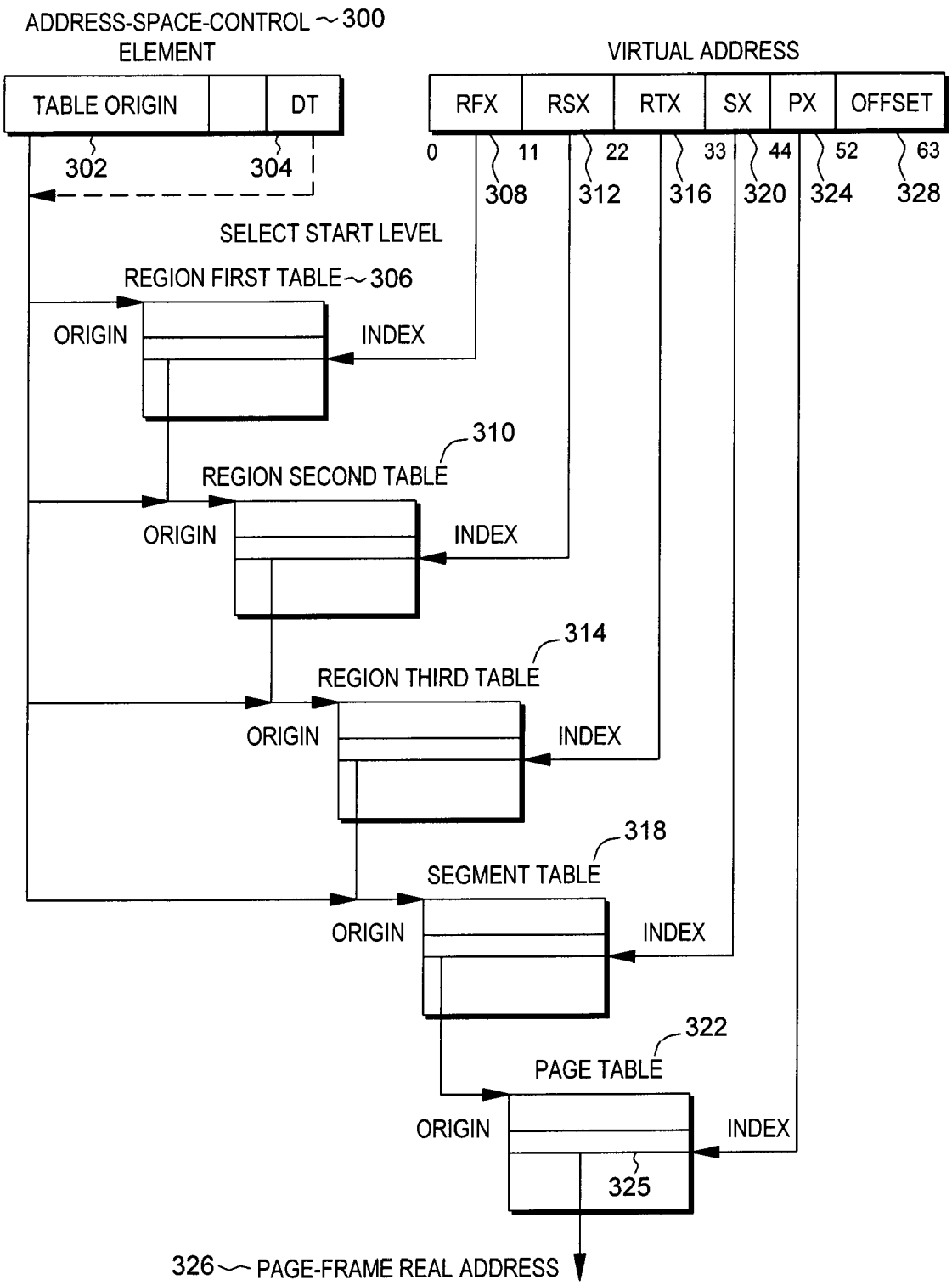
FIG. 3A depicts one example of address translation.

One example of translating a virtual address to a real address is described with reference to FIG. 3A. This process is referred to herein as a DAT walk (or a page walk) in which the address translation tables are walked to translate one address (e.g., a virtual address) to another address (e.g., a real address). In this example, an address space control element (ASCE) 300 includes a table origin 302, as well as a designation type (DT) control 304, which is an indication of a start level for translation (i.e., an indication at which level in the hierarchy address translation is to begin). Using table origin 302 and DT 304, the origin of a particular table is located. Then, based on the table, bits of the virtual address are used to index into the specific table to obtain the origin of the next level table. For instance, if the region first table (RFT) 306 is selected, then bits 0-10 (RFX) 308 of the virtual address are used to index into the region first table to obtain an origin of a region second table (RST) 310. Then, bits 11-21 (RSX) 312 of the virtual address are used to index into region second table 310 to obtain an origin of a region third table (RTT) 314. Similarly, bits 22-32 (RTX) 316 of the virtual address are used to index into region third table 314 to obtain an origin of a segment table 318. Then, bits 33-43 (SX) 320 of the virtual address are used to index into segment table 318 to obtain an origin of page table 322, and bits 44-51 (PX) 324 of the virtual address are used to index into page table 322 to obtain a page table entry (PTE) 325 having a page frame real address (PFRA) 326. The page frame real address is then combined (e.g., concatenated) with offset 328 (bits 52-63) to obtain a real address. Prefixing may then be applied to obtain the corresponding absolute address.

Figure 3B:
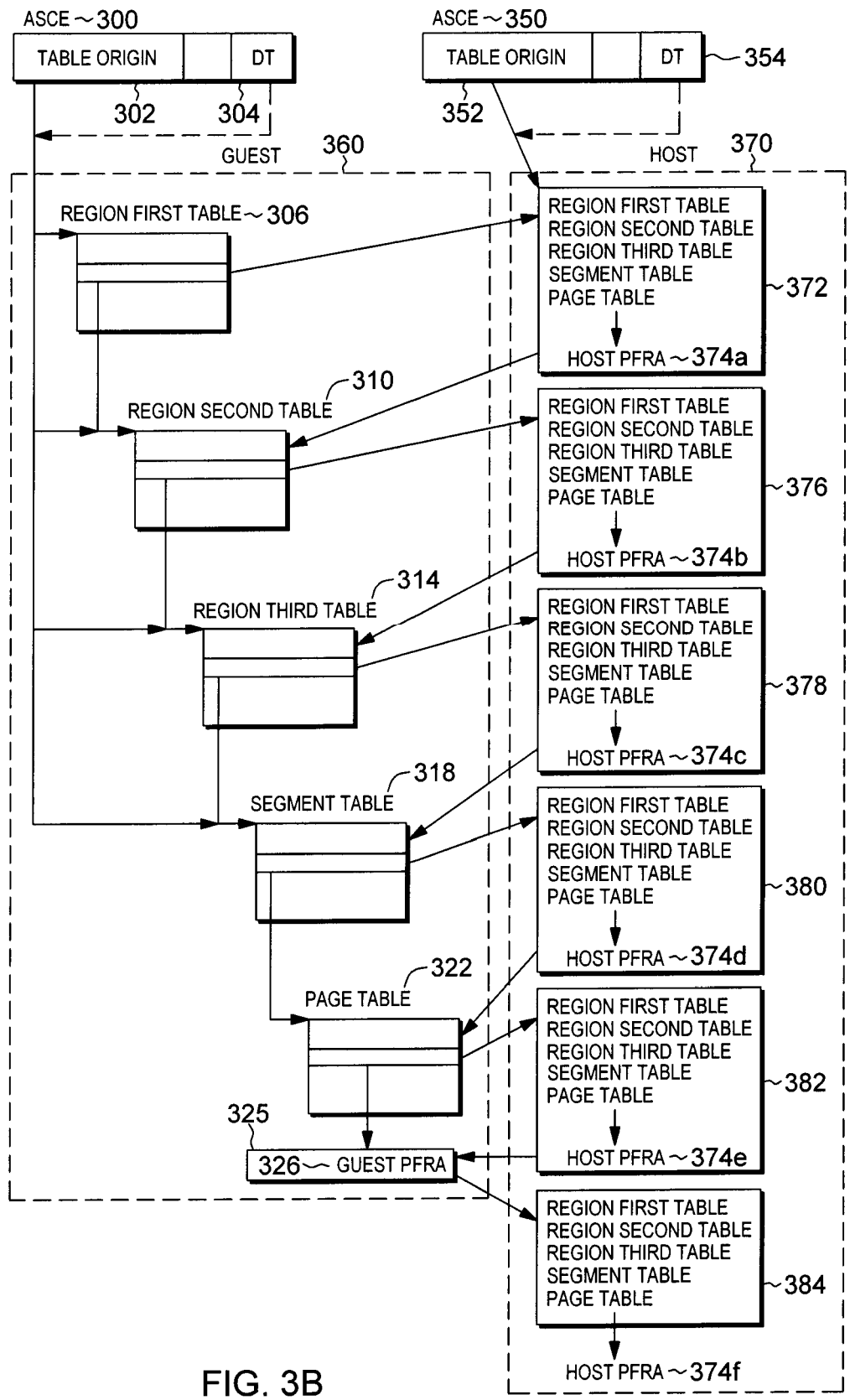
FIG. 3B depicts another example of address translation.

Another example of address translation is described with reference to FIG. 3B. In this example, a DAT walk is performed to translate an initial guest virtual address to a final host real address. In this example, address space control element (ASCE) 300 is a guest address space control element, and DT 304 of ASCE 300 indicates that guest translation determined by guest address translation structures 360 is to start at region first table 306 pointed to by table origin 302. Thus, the appropriate bits of the initial guest virtual address (e.g., RFX 308) are used to index into region first table 306 to obtain a pointer of an entry of the region first table. The address of the region first table entry (RFTE) is a guest real or absolute address. This guest real or absolute address, with the main storage origin and limit applied, corresponds to a host virtual address. This intermediate host virtual address is then translated using host address translation structures 370. In particular, address space control element (ASCE) 350 is a host address space control element used to indicate a start level for translation in host address translation structures 372. Based on the start level (e.g., region first table) indicated by DT 354 of ASCE 350, the particular bits of the host virtual address are used to index into the indicated table with table origin 352 to be used for translation using host address translation structure 372, as described with reference to FIG. 3A. The translation of the host virtual address corresponding to the guest RFTE continues until a host page frame real address (PFRA) 374a is obtained.

Data at the intermediate host page frame real address is a pointer to the next level of guest address translation structures (e.g., guest region second table 310, in this particular example), and translation continues, as described above. Specifically, host address translation structures 376, 378, 380 and 382 are used to translate the intermediate host virtual addresses associated with the guest region second table 310, region third table 314, segment table 318 and page table 322, respectively, resulting in host PFRAs 374b, 374c, 374d and 374e, respectively. Host page frame real address 374e includes the address of a guest page table entry 325. Guest page table entry 325 includes a guest page frame real address 326, which is concatenated with the offset from the initial guest virtual address to obtain the corresponding guest absolute address. In some cases, the main storage origin and limit are then applied to calculate the corresponding host virtual address, which is then translated, as described above, using address translation structures 384 to obtain host page frame real address 374f. The host page frame real address is then combined (e.g., concatenated) with the offset (e.g., bits 52-63) of the host virtual address to obtain the final host real address. This completes translation of a guest virtual address to a host real address.

Although in the above examples translation starts at the region first table, this is only one example. Translation may start at any level for either the guest or the host.

Further, in one embodiment, to improve address translation, a virtual address to real or absolute address translation mapping may be stored in an entry of a structure associated with address translation, such as a translation look-aside buffer (TLB). The TLB is a cache used by the memory management hardware to improve virtual address translation speed. The next time translation for a virtual address is requested, the TLB will be checked and if it is in the TLB, there is a TLB hit and the real or absolute address is retrieved therefrom. Otherwise, a page walk is performed, as described above.

Figure 3C:
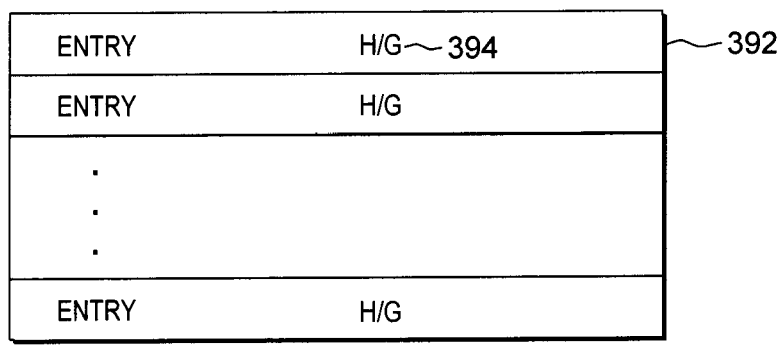
FIG. 3C depicts one example of a translation look-aside buffer, in accordance with an aspect of the present invention.

In one example, as depicted in FIG. 3C, a translation look-aside buffer 390 may include one or more entries 392. An entry may be for a host or for a guest of the computing environment, and may be marked as such with an indicator (e.g., H/G indicator 394). For instance, if H/G 394 is set to one, then it is a host entry, and if set to zero, it is a guest entry. Further, an entry may be associated with a page table entry, a region table entry or a segment table entry of the address translation tables. Many implementations of a translation look-aside buffer are possible.

As indicated, guest translations may be included in the TLB. These guest may be composite guest/host entries which implicitly include one or more host translations. For example, a guest virtual TLB entry may buffer the entire translation from the initial guest virtual address down to the final host real or absolute address. In this case, the guest TLB entry implicitly includes all intermediate host translations 372, 376, 378, 380 and 382, as well as the final host translation 384, as described in FIG. 3B above. In another example, a hierarchical TLB may contain an entry in a first level of the TLB which buffers a translation from the initial guest virtual address down to the associated origin of the guest page table 322 and a separate entry from a second level of the TLB which buffers the translation from the guest page table entry address down to the final host real or absolute address. In this example, guest entries in the first level of the TLB implicitly include intermediate host translations 372, 376, 378 and 380 which correspond to the host translations which back guest region and segment tables, and guest entries in the second level implicitly include intermediate host translation 382 which backs the guest page table and final host translation 384, as described in FIG. 3B. Many implementations of a translation look-aside buffer are possible.

In accordance with an aspect of the present invention, when pages are paged-out due to physical memory constraints, page table entries of the paged-out pages are invalidated and corresponding translation look-aside buffer (or other structures associated with address translation) entries are purged.

As examples, there are two types of TLB purges/invalidates: local and broadcast. From a software perspective, a local purge affects only the virtual CPU (vCPU) of the issuing processor (thread), and a broadcast purge affects the configuration (all threads of all cores) of the issuing processor. For local purges, although the TLB is maintained on a virtual CPU (thread) basis from an architecture and software perspective, it is maintained on a physical CPU basis from a machine perspective. This means that whenever the software (e.g., program) issues a local purge, it is the responsibility of the machine to make sure that the local purge is propagated to all physical processors (threads) that might have TLB entries pertaining to that vCPU. For guest purge requests, this management is currently performed by the Start Interpretative Execution (SIE) entry millicode whenever a guest vCPU is re-dispatched on a different physical processor.

In one embodiment, when a local invalidate/purge is performed, often only a subset of entries need to be purged. For example, an Invalidate Page Table Entry (IPTE) instruction only purges entries associated with a particular page index (PX) and page table origin (PTO). Since a large number of local purges may be performed while a vCPU is dispatched on a single physical processor (thread), the various different TLB entries that are affected are not tracked. As a result, when that vCPU is dispatched on a different physical processor (thread), all TLB entries associated with the vCPU are purged. This may result in purging more entries than actually necessary.

As indicated above, one instruction used to perform the purging is an Invalidate Page Table Entry (IPTE) instruction, an example of which is described with reference to FIGS. 4A-4E. The IPTE instruction invalidates specified page table entries and purges related TLB entries, as described herein.

Figure 4A:
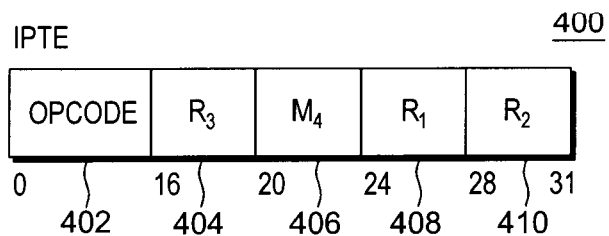
FIG. 4A depicts one example of a format of an Invalidate Page Table Entry (IPTE) instruction, in accordance with an aspect of the present invention.

Referring initially to FIG. 4A, in one example, an Invalidate Page Table Entry (IPTE) instruction 400 includes an opcode field 402 that includes an operation code specifying an invalidate page table entry operation; a first register field ($R_3$) 404; a mask field ($M_4$) 406; a second register field ($R_1$) 408; and a third register field ($R_2$) 410, each of which is described below.

Figure 4B:
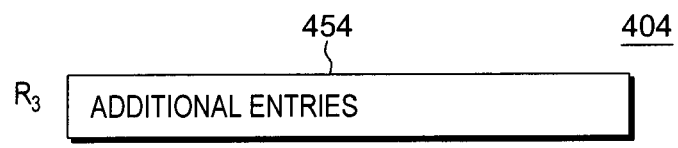
FIG. 4B depicts one example of the contents of a register used by the IPTE instruction of FIG. 4A, in accordance with an aspect of the present invention.

Referring to FIG. 4B, the register designated by register field ($R_3$) 404 provides certain information, including, for instance, a count (or range) of additional entries 454, if any, to be invalidated.

Figure 4C:
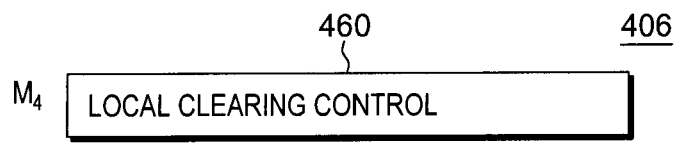
FIG. 4C depicts one example of the contents of a mask used by the IPTE instruction of FIG. 4A, in accordance with an aspect of the present invention.

Referring to FIG. 4C, mask field ($M_4$) 406 includes a local clearing control 460, which can be used, in conjunction with other parameters, to determine if the command is broadcast to all CPUs in the configuration or sent just to the issuing (local) CPU.

Figure 4D:
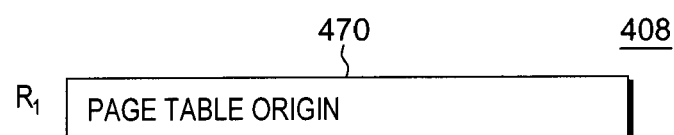
FIG. 4D depicts one example of the contents of another register used by the IPTE instruction of FIG. 4A, in accordance with an aspect of the present invention.
Figure 4E:
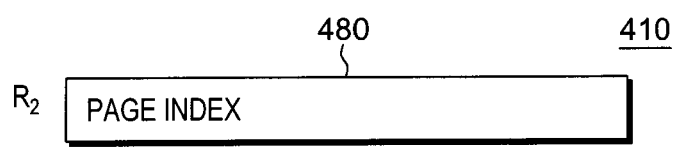
FIG. 4E depicts one example of the contents of yet another register used by the IPTE instruction of FIG. 4A, in accordance with an aspect of the present invention.

With reference to FIG. 4D, second register field ($R_1$) 408 specifies a register used to indicate a page table origin (PTO) 470 of a page of memory to be invalidated; and referring to FIG. 4E, third register field ($R_2$) 410 specifies a register used to indicate a page index (PX) 480 of a page of memory to be invalidated.

In general operation of IPTE, the designated page table entries are invalidated and the translation look-aside buffers (or other such structures) in the physical processor (thread) performing the operation and/or other physical processors (threads) in the configuration are cleared of the associated entries. Local clearing control 460 controls whether only the TLB in the local CPU (thread) is cleared or whether the TLBs in all of the CPUs of the configuration (i.e., all threads of all cores) are cleared.

In particular, as used herein, the term "specified CPU or CPUs" has the following meaning for the scope of TLBs affected by this instruction, as implemented in the z/Architecture, as one example:

When the local TLB clearing facility is not installed, or when the facility is installed and the local clearing control (LC) bit in the $M_4$ field is zero, the term "specified CPU and CPUs" means all of the CPUs in the configuration (i.e., all of the threads of all cores of the configuration).

When the local TLB clearing facility is installed and the LC bit in the $M_4$ field is one, the term "specified CPU or CPUs" means only the CPU executing the IPTE instruction (the local CPU; the local thread). The TLBs in all other CPUs in the configuration (i.e., all other threads of all cores) may not be affected.

There may be additional control bits, typically defined by the host, that might also indicate that a vCPU does not need to broadcast any purge requests. One such control bit, for example, would indicate that this vCPU is configured as a uni-processor (i.e., the only virtual CPU in the guest configuration) and, if so, then a local purge may be issued by the processor even though the IPTE instruction has specified a broadcast purge. If this is the case, then the optimization described by an aspect of the invention would also apply as if the local TLB clearing is installed and the LC bit is set.

The designated page table entries are invalidated (e.g., a page invalid indicator within the appropriate page table entries is set to one), and the translation look-aside buffers (TLBs) in the specified CPU (thread) or CPUs (threads) in the configuration are cleared of the associated entries.

The contents of the general register $R_1$ have the format of a segment table entry, with only the page table origin used. The contents of general register $R_2$ have the format of a virtual address, with only the page index used. The contents of fields that are not part of the page table origin or page index are ignored.

When the IPTE range facility is not installed, or when the $R_3$ field is zero, the single page table entry designated by the first and second operands (registers specified by $R_1$ and $R_2$, respectively) is invalidated.

When the IPTE range facility is installed and the $R_3$ field is nonzero, bits 56-63 (e.g., additional entries 454) of general register $R_3$ contain an unsigned binary integer specifying the count of additional page table entries to be invalidated. Therefore, the number of page-table entries to be invalidated is 1-256, corresponding to a value of 0-255 in bits 56-63 of the register.

When the IPTE range facility is not installed, the $R_3$ field is ignored but should contain zeros; otherwise, the program may not operate compatibly in the future.

The bits of the $M_4$ field 406 are as follows, in one example:

Reserved: Bits 0-2 are reserved. Reserved bit positions of the $M_4$ field are ignored but should contain zeros; otherwise, the program may not operate compatibly in the future.

Local Clearing Control (LC) 460. When the local TLB clearing facility is installed, the LC bit, e.g., bit 3 of the $M_4$ field, controls whether only the TLB in the local CPU (thread) is cleared or whether the TLBs in all CPUs (threads) of the configuration are cleared. When the local TLB clearing facility is not installed, bit 3 of the $M_4$ field is reserved.

Page table origin 470 in general register $R_1$ and page index 480 in general register $R_2$ designate a page table entry, following the dynamic address translation rules for page table lookup. The page table origin e.g., is treated as a 64-bit address, and the addition is performed by using the rules for 64-bit address arithmetic, regardless of the current addressing mode, which is specified by bits 31 and 32 of the current program status word (PSW). A carry out of bit position 0 as a result of the addition of the page index and page table origin is not to occur. The address formed from these two components is a real or absolute address. The page invalid bit of this page table entry is set to one. During this procedure, in one example, the page table entry is not inspected for whether the page invalid bit is already one or for format errors. Additionally, the page frame real address contained in the entry is not checked for an addressing exception in this example.

When the IPTE range facility is installed and the $R_3$ field is nonzero, the instruction is interruptible, and processing is as follows, in one embodiment:

1. The invalidation process described above is repeated for each subsequent entry in the page table until either the number of additional entries specified in bits 56-63 of general register $R_3$ have been invalidated or an interruption occurs.
2. The page index in bits 44-51 of general register $R_2$ is incremented by the number of page table entries that were invalidated; a carry out of bit position 44 of general register $R_2$ is ignored.
3. The additional entry count in bits 56-63 of general register $R_3$ is decremented by the number of page table entries that were invalidated.

Therefore, when the IPTE range facility is installed, the $R_3$ field is nonzero, and an interruption occurs (other than one that causes termination), general registers $R_2$ and $R_3$ have been updated, so that the instruction, when re-executed, resumes at the point of interruption.

When the IPTE range facility is not installed, or when the $R_3$ field is zero, the contents of registers $R_2$ and $R_3$ remain unchanged.

For each page table entry that is invalidated, the entire page table entry appears to be fetched concurrently from storage as observed by other CPUs. Subsequently, the byte containing the page invalid bit is stored. The fetch access to each page table entry is subject to key controlled protection, and the store access is subject to key controlled protection and low address protection.

A serialization function is performed before the operation begins and again after the operation is completed. As is the case for other serialization operations, this serialization applies only to this CPU; other CPUs are not necessarily serialized.

If no exceptions are recognized, this CPU (thread) clears selected entries from its TLB. Then, if the local TLB clearing facility is not installed, or if the facility is installed and the LC bit in the $M_4$ field is zero, this CPU signals all CPUs in the configuration (i.e., all threads in all cores) to clear selected entries from their TLBs. For each page table entry invalidated, each affected TLB is cleared of at least those entries that have been formed using all of the following:

The page table origin specified by general register $R_1$
The page index specified by general register $R_2$
The page frame real address contained in the designated page table entry.

The execution of Invalidate Page Table Entry is not completed on the CPU which executes it until the following occur, in one embodiment:
1. All page table entries corresponding to the specified parameters have been invalidated.
2. All entries corresponding to the specified parameters have been cleared from the TLB of this CPU. When the local TLB clearing facility is installed and the LC bit in the $M_4$ field is one, the execution of Invalidate Page Table entry is complete at this point and the following step is not performed.
3. When the local TLB clearing facility is not installed, or when the facility is installed and the LC bit in the $M_4$ field is zero, all other CPUs in the configuration have completed any storage accesses, including the updating of the change and reference bits, by using TLB entries corresponding to the specified parameters.

When the IPTE range facility is installed, the $R_3$ field is nonzero, and the page index in general register $R_2$ plus the additional entry count in general register $R_3$ is greater than 255, a specification is recognized.

The operation is suppressed on all addressing and protection exceptions.

Condition Code: The code remains unchanged.

The Invalidate Page Table Entry instruction described above is only one example of an instruction requesting purging. Other instructions may also be used including, for instance, an Invalidate DAT Table Entry (IDTE) instruction and a Compare and Replace DAT Table Entry (CRDTE) instruction, as well as others. Further, the purge request may be provided or obtained in other ways.

The Invalidate DAT Table Entry (IDTE) instruction is similar to the IPTE instruction, except that designated region table or segment table entries (instead of page table entries) are invalidated and the associated TLB entries are purged. The IDTE instruction has a format that includes, e.g., an $R_3$ field specifying one register; an $M_4$ field specifying a mask; an $R_1$ field specifying another register; and an $R_2$ field specifying yet a further register, each of which is used to invalidate/purge particular entries.

Similarly, the Compare and Replace DAT Table Entry (CRDTE) instruction (having a similar format of $R_3$, $M_4$, $R_1$, and $R_2$) may be used to purge guest TLB entries of associated page table, segment table and/or region table entries being compared and replaced.

Other instructions may also be used; as well as other types of requests. Many variations are possible.

As described above, the invalidation instructions invalidate entries of address translation tables (e.g., page table entries, segment table entries, and/or region table entries), as well as purge corresponding entries of structures associated with address translation (e.g., translation look-aside buffers). Further details regarding the purging of entries of structures associated with address translation are described below.

Figure 5:
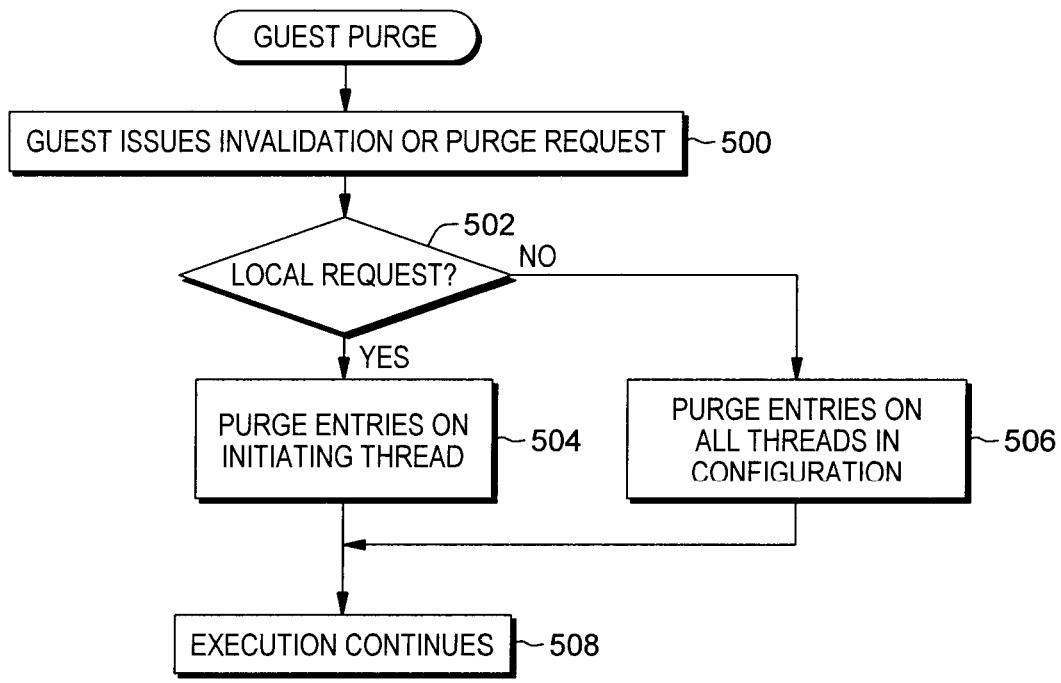
FIG. 5 depicts one embodiment of logic to service a guest invalidation or purge request.

One embodiment of a current implementation for servicing a guest purge request is described with reference to FIG. 5. In one example, a guest executing on a hardware thread issues an invalidation or purge request, STEP 500. For instance, a guest issues an IPTE instruction. A determination is made as to whether the purge request is a local request, INQUIRY 502. For instance, local clearing control 460 of mask field 406 of the IPTE instruction is checked to see if it is a local request. If local clearing control 460 is set to one, it is a local request.

Based on the purge request being a local request, relevant entries in the TLB of the initiating guest hardware thread are purged, STEP 504. In the case of IPTE, for example, the relevant entries include all guest entries whose PX and PTO match those specified by the IPTE instruction. The relevant entries are selective guest entries, e.g., based on the page being invalidated, rather than all guest entries regardless of the page being invalidated.

Otherwise, if the purge request is not a local request, INQUIRY 502, then the IPTE purge request is broadcast to all processors in the configuration (i.e., all threads in all cores of the configuration) and relevant entries on all the TLBs in the configuration are purged, STEP 506. Subsequent to purging the entries, STEP 504, 506, execution continues, STEP 508.

Figure 6:
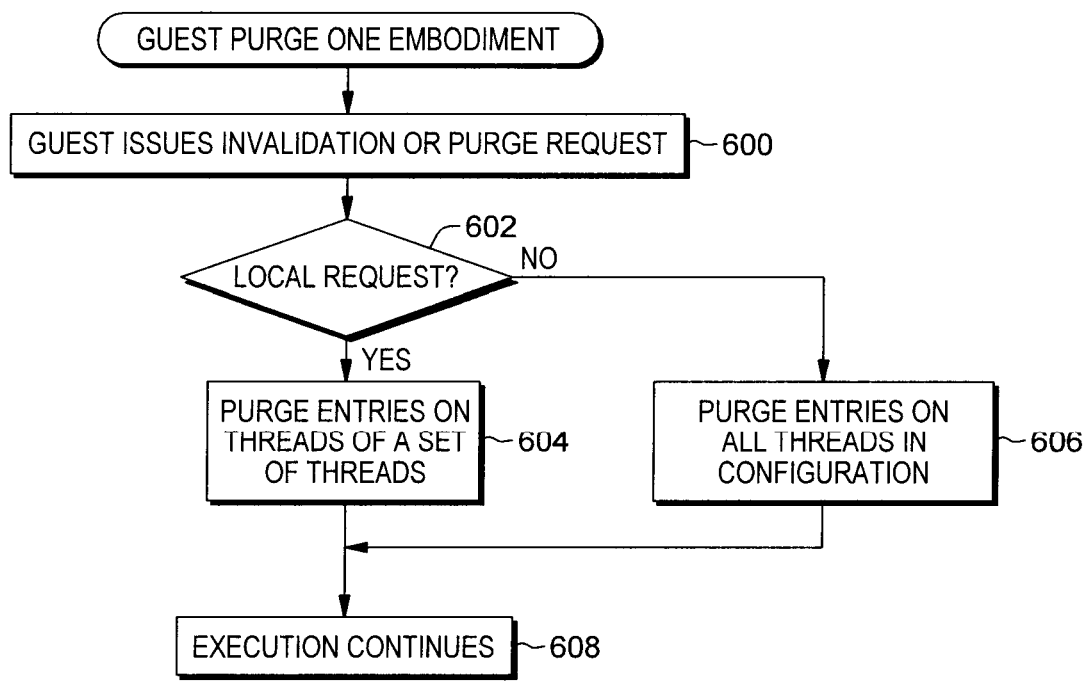
FIG. 6 depicts another embodiment of logic to service a guest invalidation or purge request, in accordance with an aspect of the present invention.

In accordance with an aspect of the present invention, the above process further includes increasing the scope of the local purges, as described with reference to FIG. 6. Referring to FIG. 6, in one example, a guest executing on a hardware thread of a particular physical core issues an invalidation or purge request, e.g., an IPTE instruction, STEP 600. A determination is made as to whether the purge request is a local request, INQUIRY 602. If it is a local request (e.g., local clearing control 460 is set to one), then relevant entries in the TLBs of a set of hardware threads of the machine configuration are purged, rather than just the relevant entries of the initiating thread, STEP 604. The set of hardware threads may be determined, in one example, by the topology of the system. The set may include, for example, some or all of the threads of the physical core where the request was initiated, some or all of the threads of all of the physical cores of a physical processor chip where the request was initiated, or some or all of the threads of a plurality of physical processor chips. This set is defined by the machine for every local purge.

Otherwise, if it is not a local request, then relevant entries on all of the hardware threads in the configuration are purged based on a broadcast purge, STEP 606. Subsequent to purging the entries, STEP 604, 606, execution continues, STEP 608.

In one particular embodiment, the set includes all the threads of the initiating core. By increasing the scope of local purging to entries in the TLBs on all (or a subset) of the threads on a single core, the penalty of dispatching a given guest vCPU on a different thread within a physical core is decreased.

Moreover, although the particular embodiment purges, based on a local purge request, TLB entries from the threads of a single core, in further examples, TLB entries from threads of multiple cores may be purged, based on the local request. Again, the set may be defined as above. By increasing the scope of local purging to the threads of a defined set, as described above, the penalty of dispatching a given vCPU on a different thread within a set of threads is decreased. Further, the purging of all entries at Start Interpretative Execution (SIE) entry when a guest vCPU moves to a different hardware thread may be eliminated; thus, increasing system performance.

In addition to the above, the invalidating/purging may also be performed on entry into Start Interpretative Execution (SIE) mode. One embodiment of a conventional approach for purging based on SIE entry is described with reference to FIG. 7. This logic is performed by the hardware thread entering SIE.

Figure 7:
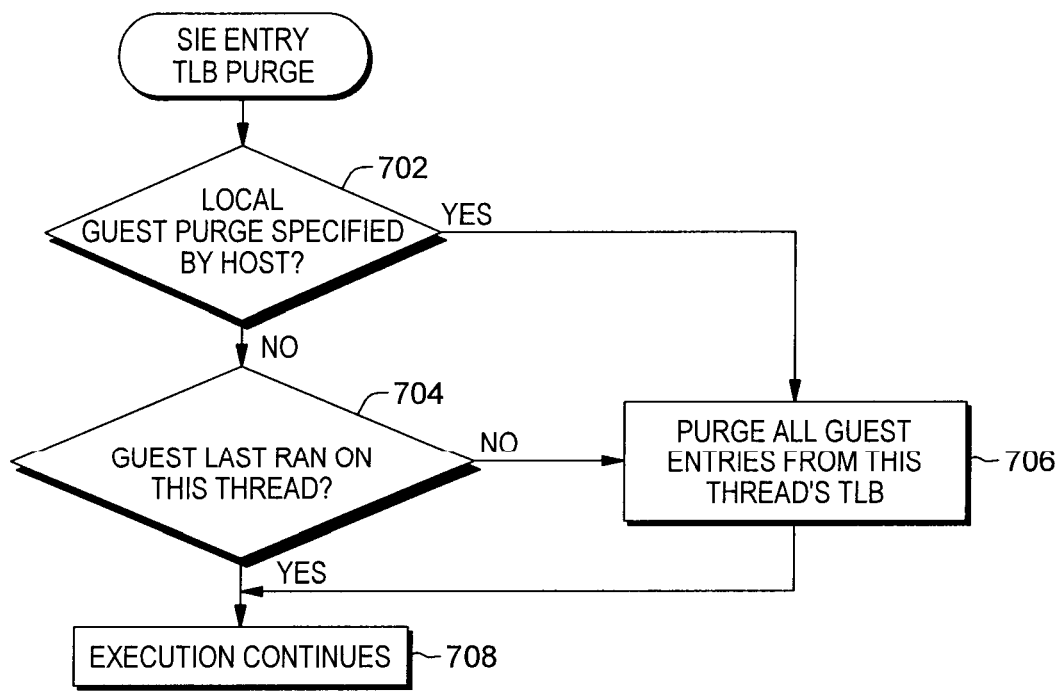
FIG. 7 depicts one embodiment of logic to manage a translation look-aside buffer on Start Interpretative Execution (SIE) entry.

Referring to FIG. 7, initially, a determination is made as to whether a local guest purge has been specified by the host, e.g., in the state description, INQUIRY 702. If the host did not specify a local guest purge, then a further determination is made as to whether the guest that is entering SIE last ran on this hardware thread, INQUIRY 704. If the guest did last run on this hardware thread, INQUIRY 704, then no purge is performed and execution continues, STEP 708.

Otherwise, if the guest did not last run on this hardware thread, INQUIRY 704, or if the host did request a local guest purge, INQUIRY 702, then all guest entries (i.e., not selective guest entries, but all the entries of the guest) from this hardware thread's TLB are purged, STEP 706. Execution continues, STEP 708. This purge is done to ensure that any TLB entries that may have been invalidated by a local purge when that guest vCPU was running on a different hardware thread will be purged as is defined by the architecture.

In accordance with an aspect of the present invention, the above SIE processing further checks whether the guest last ran on a thread within a defined set of threads rather than checking if it last ran on the initiating hardware thread, and processing proceeds based thereon. One embodiment of this logic is described with reference to FIG. 8. This logic is performed by the hardware thread entering SIE.

Figure 8:
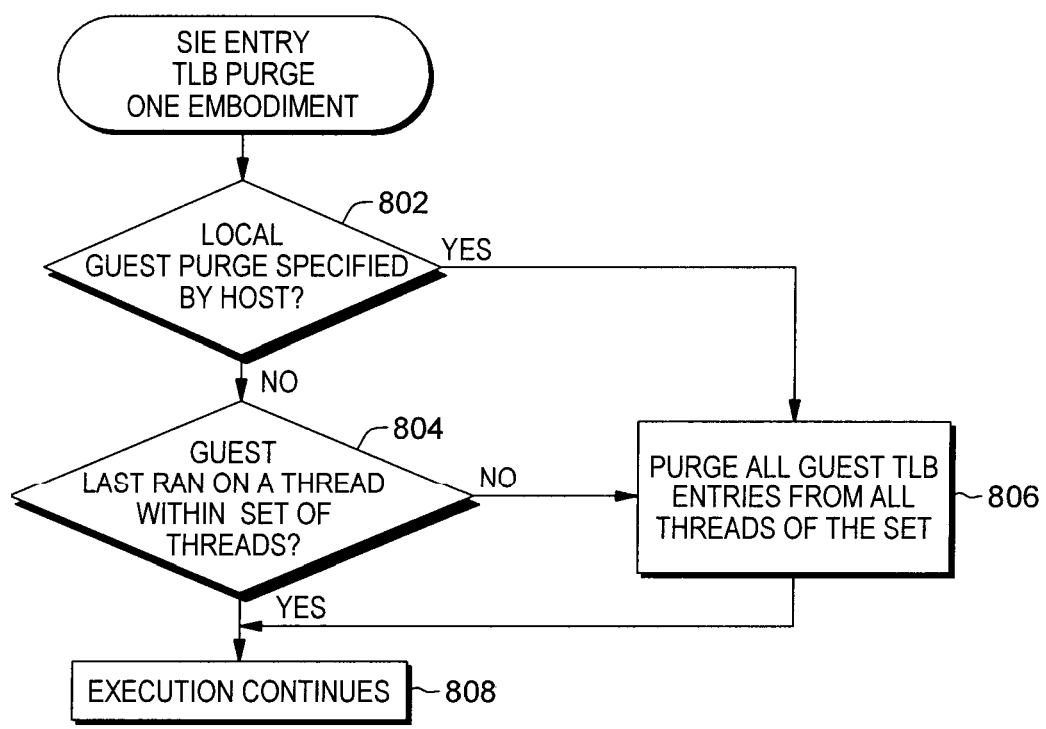
FIG. 8 depicts another embodiment of logic to manage a translation look-aside buffer on SIE entry, in accordance with an aspect of the present invention.

Referring to FIG. 8, initially, a determination is made as to whether a local guest purge has been specified by the host (e.g., in the state description), INQUIRY 802. If the host did not request a local guest purge, then a further determination is made as to whether the guest last ran on a thread within the set of threads that contain the thread issuing SIE (as opposed to checking whether it last ran on this thread), INQUIRY 804. If the guest did last run on a thread within the set of threads, INQUIRY 804, then execution continues, STEP 808. Otherwise, if the guest did not last run on this set of threads, INQUIRY 804, or the host did request a local guest purge, INQUIRY 802, then all of the guest entries (that is, all entries of the guest, rather than, e.g., selective entries associated with a particular page) of the TLB on all of the threads of this set of threads are purged, STEP 806. This means that when a guest moves between threads within a set of threads, SIE entry no longer purges the guest TLB. This purge can be eliminated, since any local purge that was issued while the guest was running on another hardware thread was serviced on this thread when the local purge issued. This decreases purging and may increase overall system performance.

In a further aspect, complete purges are tracked, and therefore, the scope of local purges is increased, based on an indication that a full local purge has not already been performed while this vCPU (guest) is running on the hardware thread. This is further described with reference to FIGS. 9-10.

Figure 9:
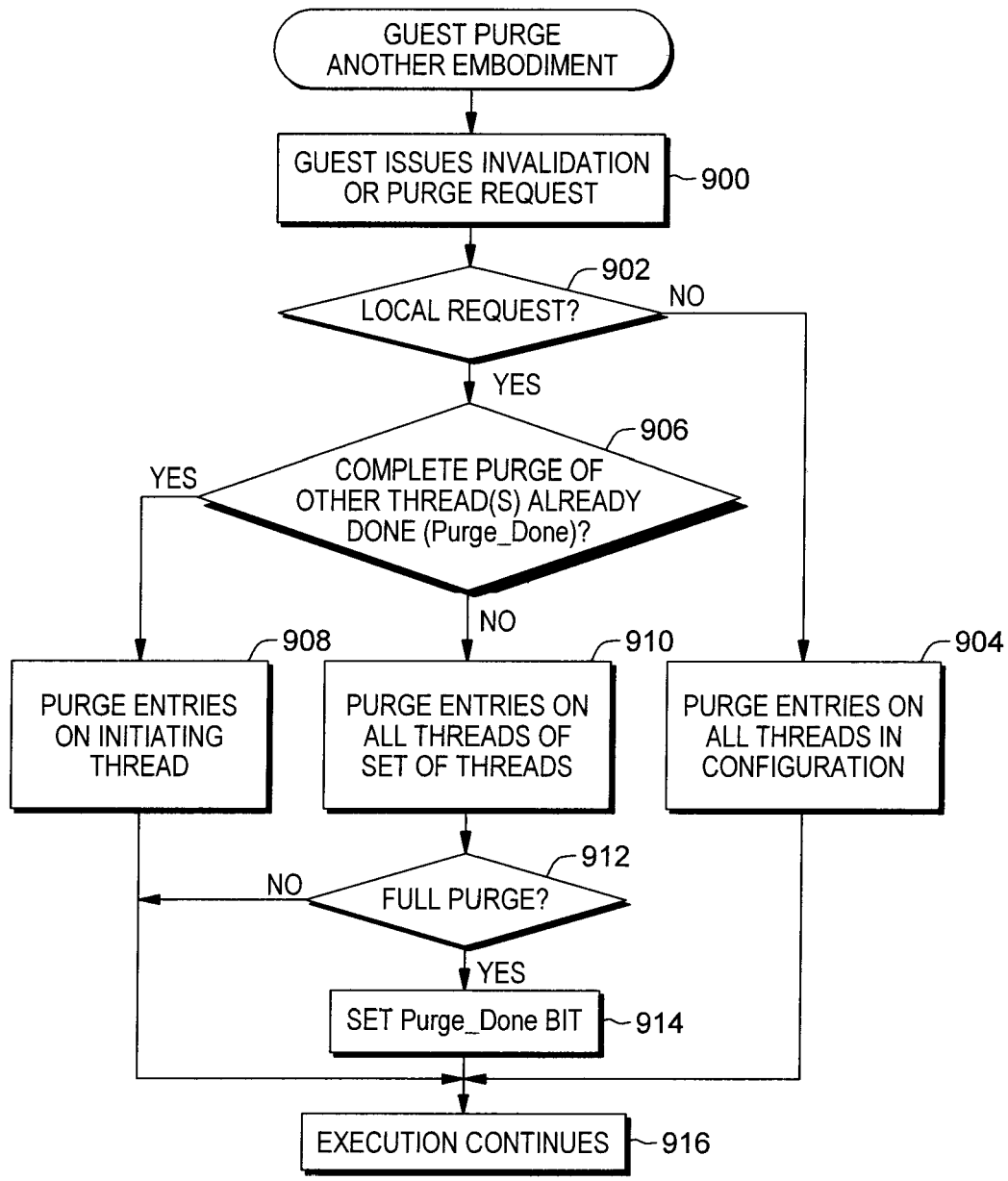
FIG. 9 depicts yet another embodiment of logic to service a guest invalidation or purge request, in accordance with an aspect of the present invention.

Referring to FIG. 9, another embodiment of logic associated with a guest request to purge is described. Initially, a guest executing on a hardware thread of a physical core issues an invalidation or purge request (e.g., an IPTE instruction), STEP 900. A determination is made as to whether the request is a local request (e.g., is local clearing control 460 set to one), INQUIRY 902. If the request is not a local request, then relevant entries (or all guest entries if the purge request is a full purge request) on all hardware threads in the configuration (i.e., all hardware threads of all cores of the configuration) are purged, STEP 904, and execution continues, STEP 916. However, if the request is a local request, then a further determination is made as to whether a complete purge of other thread(s) within the set of threads has already been done (e.g., a Purge_Done indicator stored in, e.g., memory is checked), INQUIRY 906. If a complete purge has been done previously, then relevant entries (or all for a full purge request) in the TLB on the hardware thread initiating the purge are purged, STEP 908, and execution continues, STEP 916. Otherwise, if a complete purge has not been done, then relevant entries (or all for a full purge request) in the TLBs on all threads of the set of threads are purged, STEP 910.

Thereafter, a determination is made as to whether the request was a full purge request (not a request of selective entries, but of all guest entries), INQUIRY 912. If not, then execution continues, STEP 916. However, if the request was a full purge request, INQUIRY 912, then the Purge_Done indicator is set (e.g., to one), STEP 914. Execution then continues, STEP 916.

Figure 10:
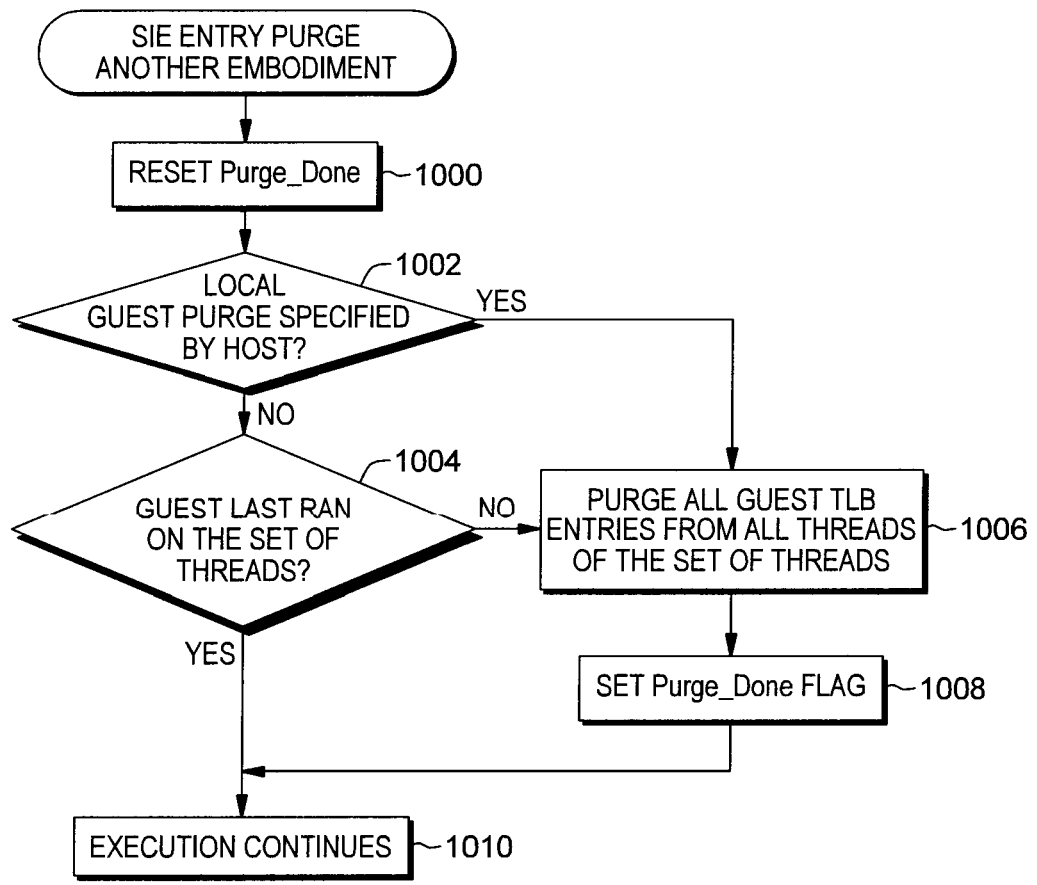
FIG. 10 depicts another embodiment of logic to manage a translation look-aside buffer on SIE entry, in accordance with an aspect of the present invention.

FIG. 10 depicts another embodiment of purging on SIE entry. This logic is performed by the thread entering SIE. Initially, the Purge_Done indicator is reset (e.g., set to zero) on SIE entry, STEP 1000. A determination is made as to whether a local guest purge is specified by the host (e.g., in state description), INQUIRY 1002. If the host did not specify a local guest purge, then a further determination is made as to whether the guest last ran on the set of threads, INQUIRY 1004. If the guest did last run on the set of threads, INQUIRY 1004, no purge is performed, and execution continues, STEP 1010. Otherwise, if the guest thread did not last run on the set of threads, INQUIRY 1004, or the host did specify a local guest purge, INQUIRY 1002, then all guest entries (not just the relevant entries) in the TLBs on all threads of this set of threads are purged, STEP 1006, and the Purge_Done indicator is set (e.g., to one), STEP 1008. Processing then continues to STEP 1010.

Described above are techniques for increasing the scope of local purges, thus decreasing the number of SIE purges, and increasing overall system performance. In further embodiments, the scope can be increased to any physical processor granularity where the overhead of expanding the scope of the local purge is small enough to see benefit from reducing the residual penalty of the SIE entry purge, not necessarily to all threads in the core, and not necessarily limited to the threads on one core. The granularity of processor dispatch affinity that can be maintained by the hypervisor would also be a factor in determining the optimum increased scope of local invalidates.

Described in detail above are capabilities for increasing the scope of local purges, which may eliminate or reduce the more drastic purge of all entries at SIE entry when the guest moves to a different thread. In addition, aspects of this invention may help provide additional flexibility to the hypervisor dispatch logic by decreasing the machine penalty of dispatching a given guest vCPU on a different thread.

Moreover, in an environment where the hypervisor does not maintain dispatch affinity between threads on a core and the guest uses local purge/invalidate commands to manage their TLB, a performance benefit may be realized by not purging the entire TLB as the vCPU moves back and forth between the threads.

Machine topology and overhead of signaling (e.g., issuing IPTE), transparent to the software, are used to determine the scope of purges. Further, machine-dependent hardware adjustments are allowed to reduce and improve purge signaling requirements between threads.

Figure 11A:
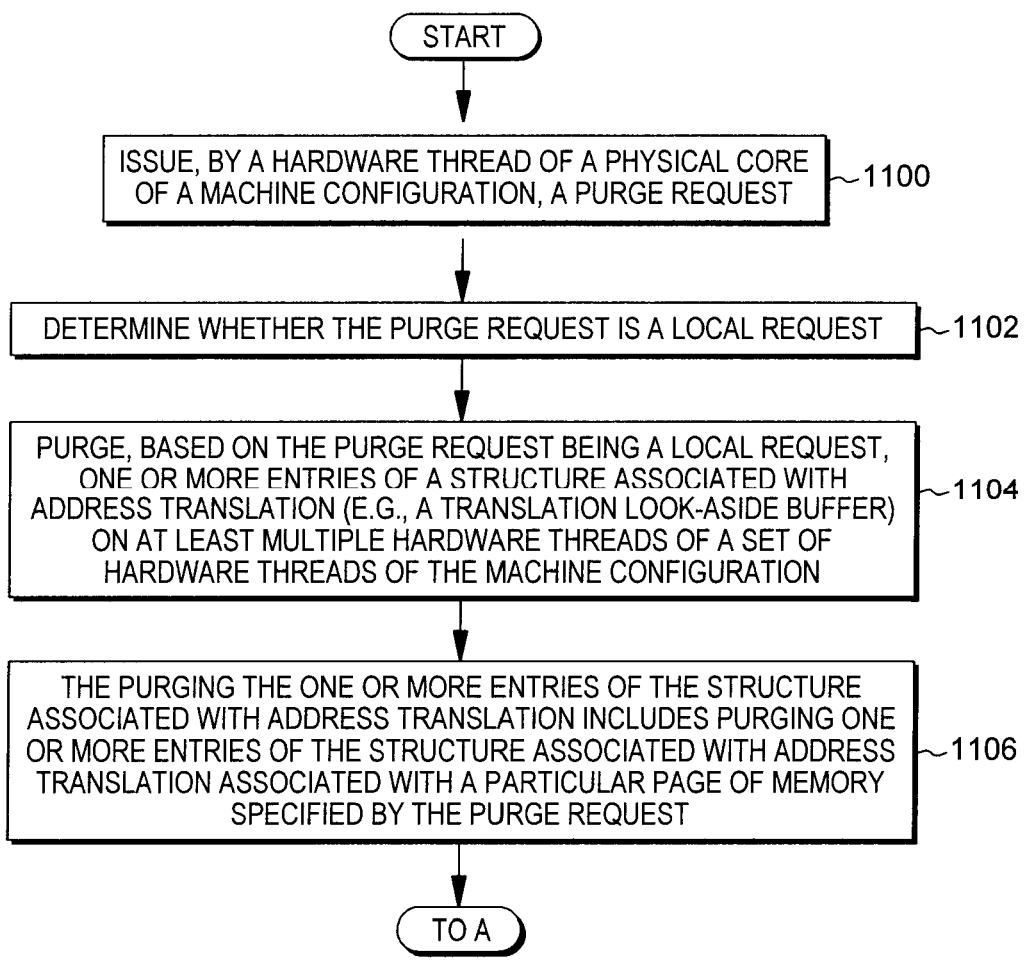
FIGS. 11A-11C depict further details of processing associated with servicing purge requests in a computing environment, in accordance with an aspect of the present invention.

Further details regarding purge processing are described with reference to FIGS. 11A-11C. Referring initially to FIG. 11A, a hardware thread of a physical core of a machine configuration issues a purge request (1100). A determination is made as to whether the purge request is a local request (1102). Based on the purge request being a local request, one or more entries of a structure associated with address translation (e.g., a translation look-aside buffer) are purged on at least multiple hardware threads of a set of hardware threads of the machine configuration (1104). As one example, the purging of the one or more entries of the structure associated with address translation includes purging one or more entries of the structure associated with address translation associated with a particular page of memory specified by the purge request (1106).

Figure 11B:
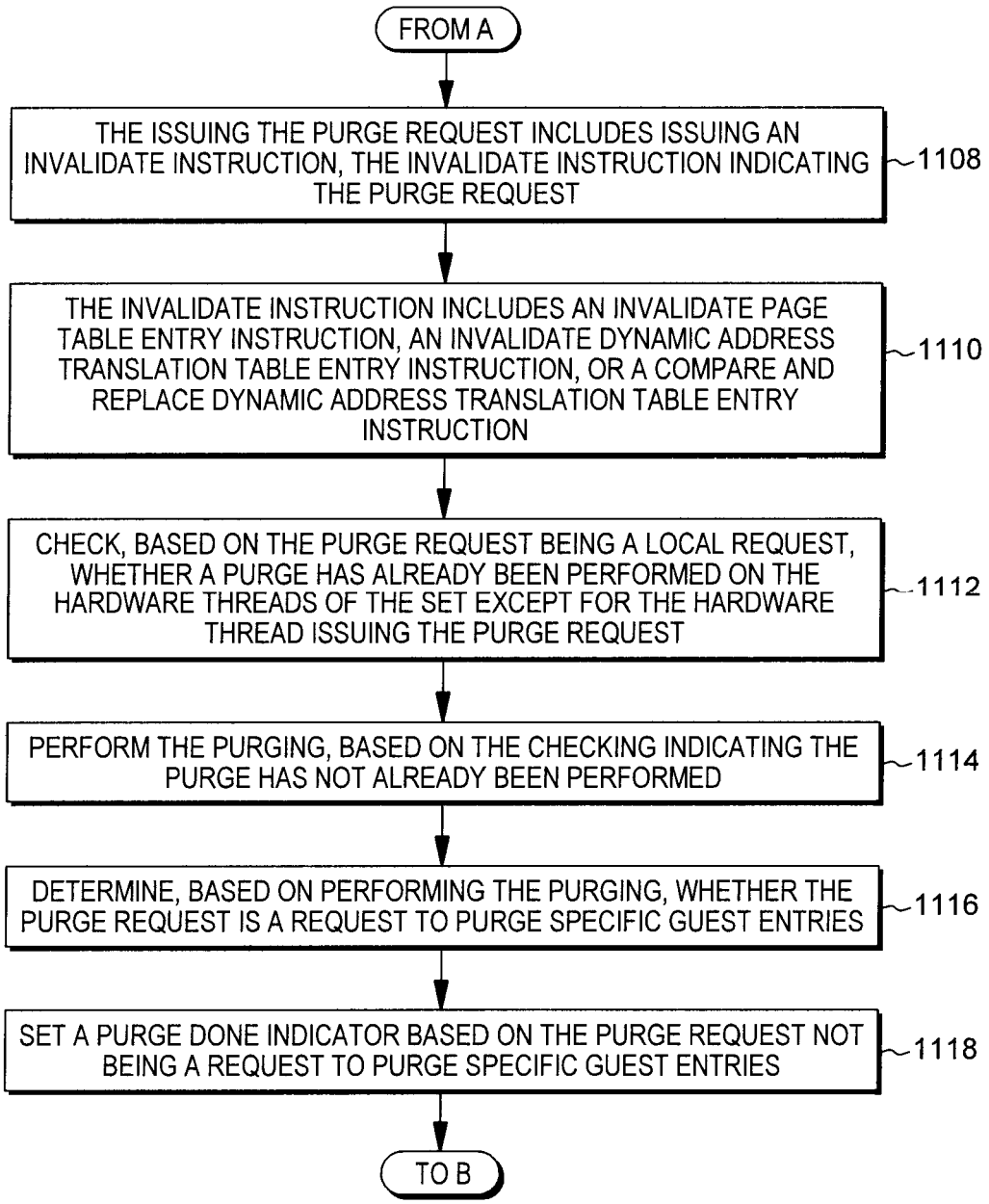

In one embodiment, the issuing of the purge request includes issuing an invalidate instruction, which indicates the purge request (1108) FIG. 11B. The invalidate instruction includes, for instance, an invalidate page table entry instruction, an invalidate dynamic address translation table entry instruction, or a compare and replace dynamic address translation table entry instruction (1110).

In a further embodiment, based on the purge request being a local request, a check is made as to whether a purge has already been performed on the hardware threads of the set of hardware threads except for the hardware thread issuing the purge request (1112). Based on the checking indicating the purge has not already been performed, the purging is performed (1114).

Further, in one example, based on performing the purging, a determination is made as to whether the purge request is a request to purge specific guest entries (1116). Based on the purge request not being a request to purge specific guest entries, a purge done indicator is set (1118).

Figure 11C:
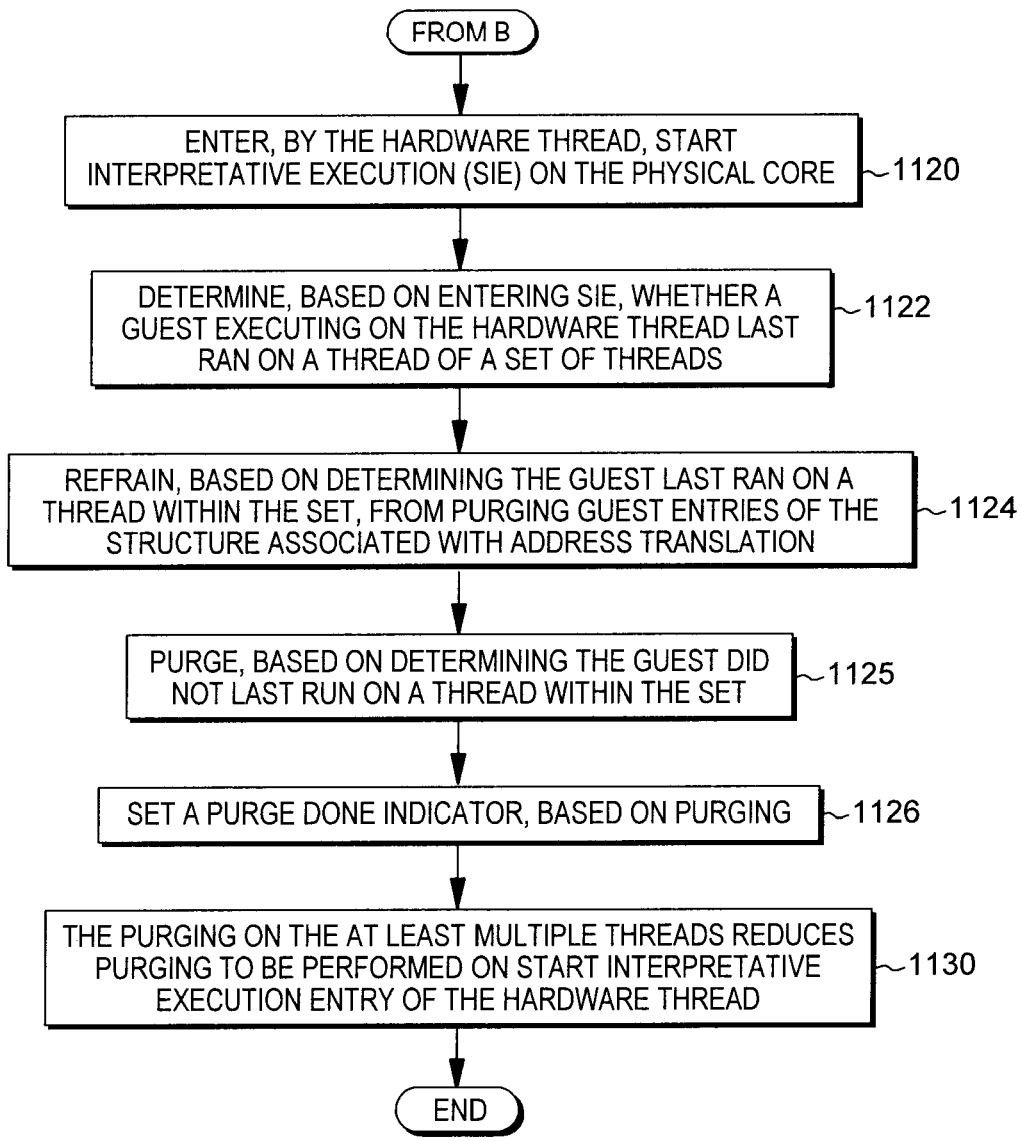

In yet another embodiment, the hardware thread is entering start interpretative execution (SIE) on the physical core (1120), FIG. 11C. Based on entering SIE, a determination is made as to whether a guest executing on the hardware thread last ran on a thread within the set of threads (1122). Based on determining the guest last ran on a thread within the set of threads, refrain from purging guest entries of the structure associated with address translation (1124).

In a further embodiment, based on determining the guest did not last run on a thread within the set of threads, guest entries of the structure associated with address translation are purged (1125), and a purge done indicator is set (1126).

As one example, the purging on the at least multiple threads reduces purging to be performed on start interpretative execution entry of the hardware thread (1130).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 12:
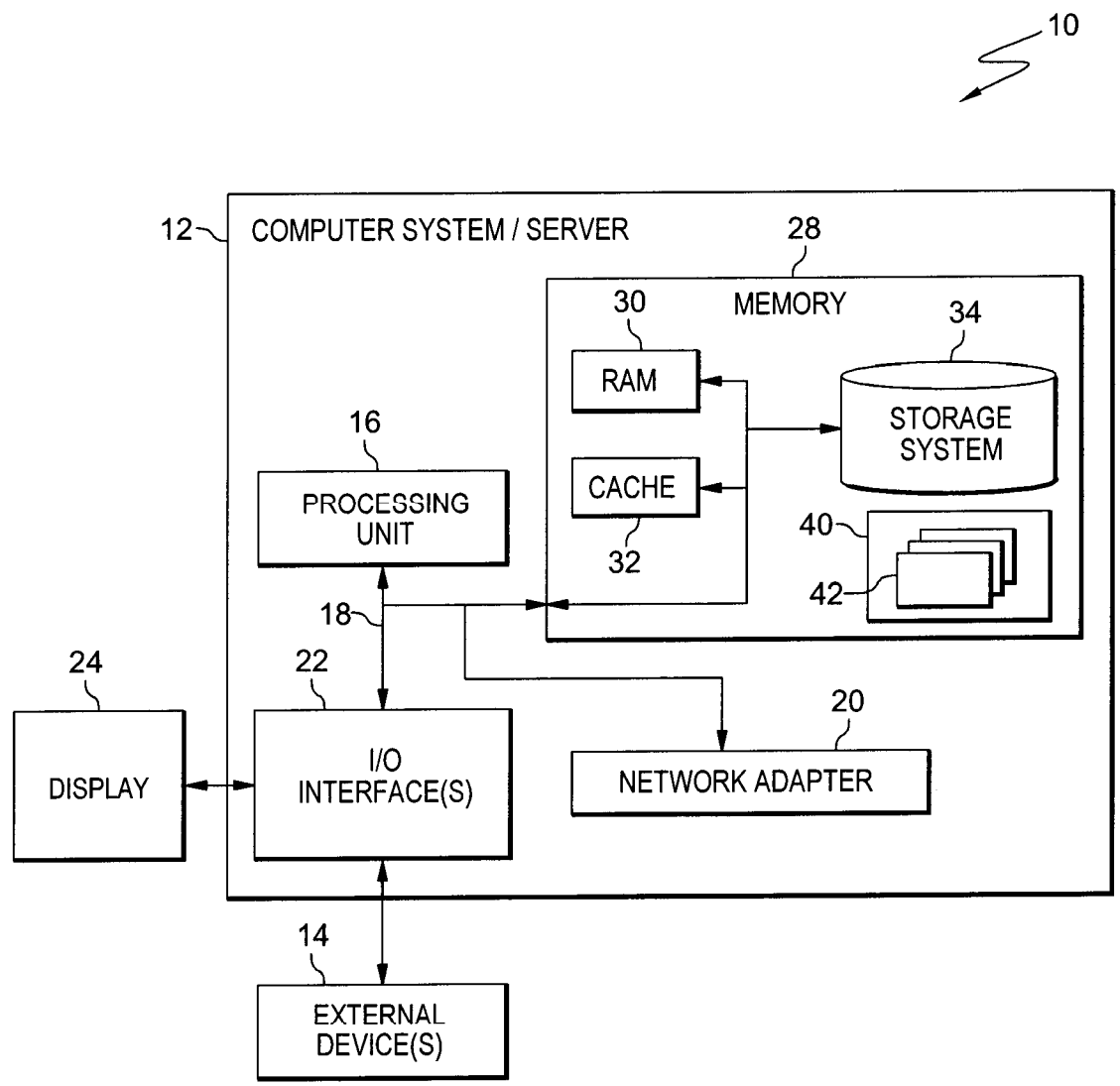
FIG. 12 depicts one embodiment of a cloud computing node.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
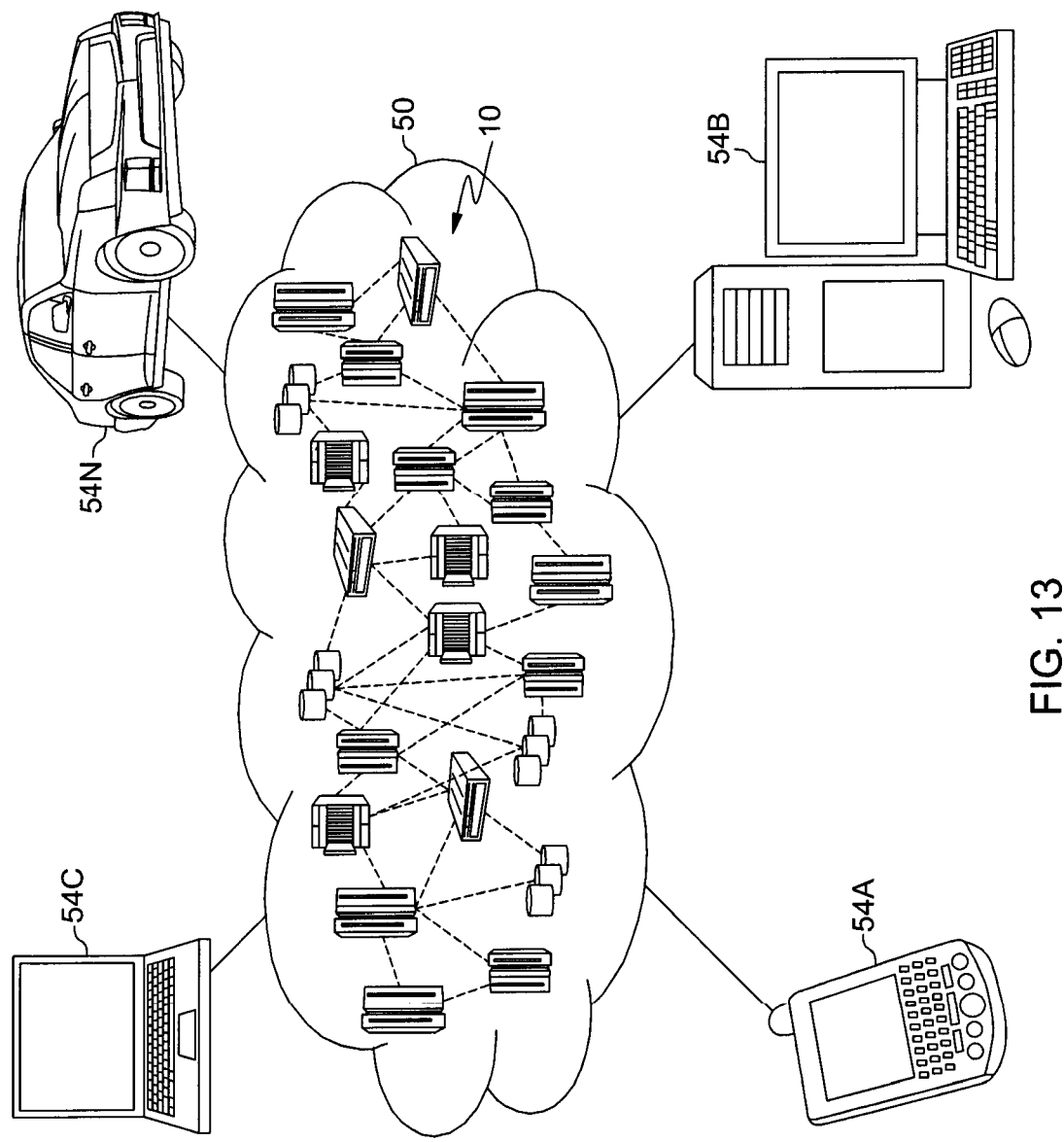
FIG. 13 depicts one embodiment of a cloud computing environment.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
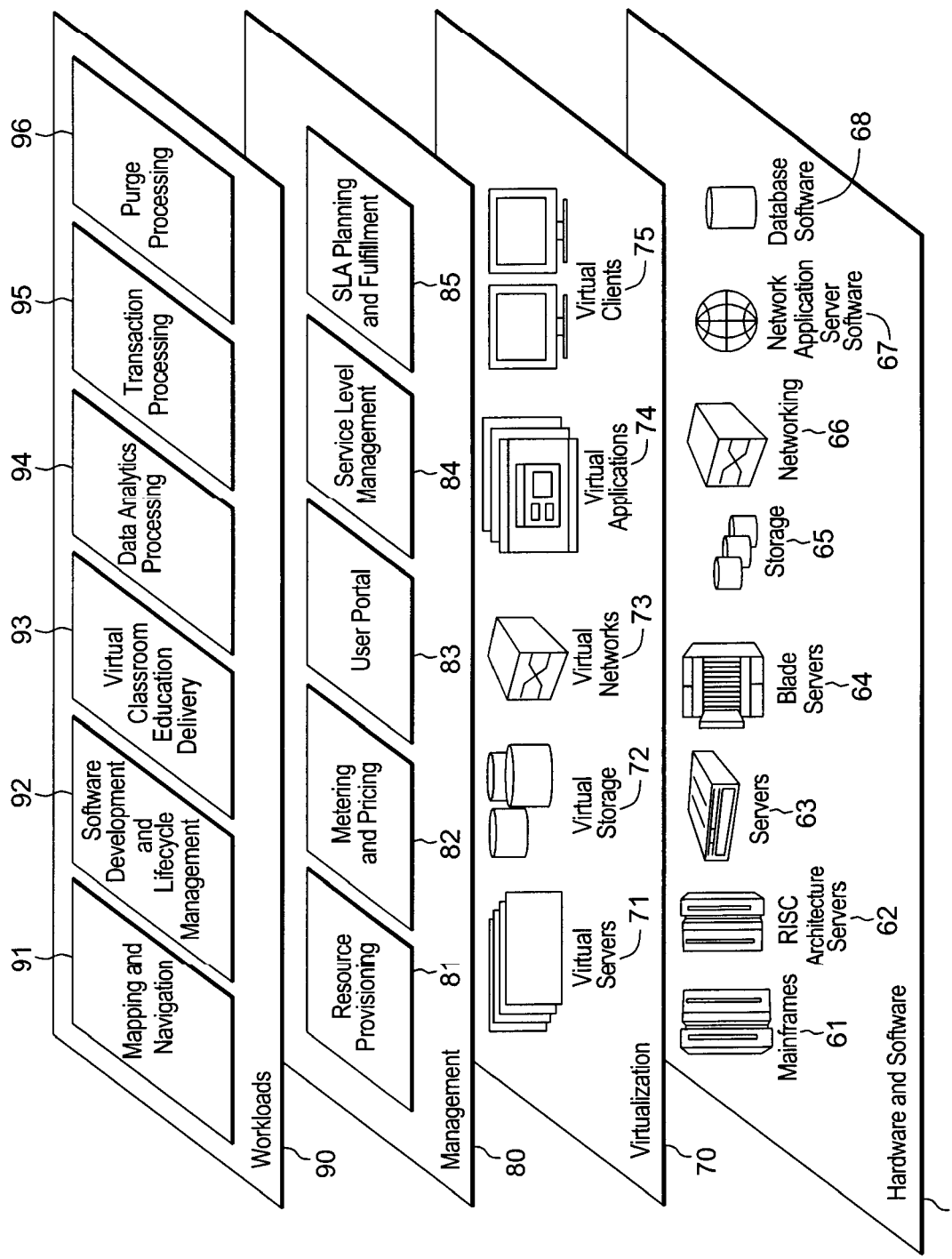
FIG. 14 depicts one example of abstraction model layers.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and purge processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
   at least one computer readable storage medium readable by at least one processing circuit and storing instructions for performing a method comprising:
      issuing, by a hardware thread of a physical core of a machine configuration, a purge request;
      determining, using a control of the purge request, whether the purge request is a local request; and
      purging, based on determining using the control of the purge request that the purge request is a local request, one or more entries of a structure associated with address translation on at least multiple hardware threads of a set of hardware threads of the machine configuration.

2. The computer program product of claim 1, wherein the purging the one or more entries of the structure associated with address translation includes purging one or more entries of the structure associated with address translation associated with a particular page of memory specified by the purge request.

3. The computer program product of claim 1, wherein the purge request is included as part of a request to invalidate one or more entries of an address translation structure and to purge the one or more entries of the structure associated with address translation.

4. The computer program product of claim 1, wherein the issuing the purge request includes issuing an invalidate instruction, the invalidate instruction indicating the purge request.

5. The computer program product of claim 4, wherein the invalidate instruction includes an instruction selected from the group consisting of: an invalidate page table entry instruction, an invalidate dynamic address translation table entry instruction, and a compare and replace dynamic address translation table entry instruction.

6. The computer program product of claim 1, wherein the method further comprises:
   checking, based on the purge request being a local request, whether a purge has already been performed on the hardware threads of the set of hardware threads except for the hardware thread issuing the purge request; and
   performing the purging, based on the checking indicating the purge has not already been performed.

7. The computer program product of claim 6, wherein the method further comprises:
   determining, based on performing the purging, whether the purge request is a request to purge specific guest entries; and
   setting a purge done indicator based on the purge request not being a request to purge specific guest entries.

8. The computer program product of claim 1, wherein the method further comprises:
   entering, by the hardware thread, Start Interpretative Execution (SIE) on the physical core;
   determining, based on entering SIE, whether a guest executing on the hardware thread last ran on a thread within the set of threads; and
   refraining, based on determining the guest last ran on a thread within the set of threads, from purging guest entries of the structure associated with address translation.

9. The computer program product of claim 8, wherein the method further comprises:
   purging, based on determining the guest did not last run on a thread within the set of threads, guest entries of the structure associated with address translation on threads of the set of threads; and
   setting a purge done indicator, based on purging the guest entries on the threads of the set of entries.

10. The computer program product of claim 1, wherein the purging on the at least multiple threads reduces purging to be performed on Start Interpretative Execution entry of the hardware thread.

11. A computer system for facilitating processing in a computing environment, said computer system comprising:
    a memory; and
    a hardware thread in communication with the memory, wherein the computer system is configured to perform a method, said method comprising:
       issuing, by the hardware thread of a physical core of a machine configuration, a purge request;
       determining, using a control of the purge request, whether the purge request is a local request; and
       purging, based on determining using the control of the purge request that the purge request is a local request, one or more entries of a structure associated with address translation on at least multiple hardware threads of a set of hardware threads of the machine configuration.

12. The computer system of claim 11, wherein the method further comprises:
    checking, based on the purge request being a local request, whether a purge has already been performed on the hardware threads of the set of hardware threads except for the hardware thread issuing the purge request; and
    performing the purging, based on the checking indicating the purge has not already been performed.

13. The computer system of claim 12, wherein the method further comprises:
    determining, based on performing the purging, whether the purge request is a request to purge specific guest entries; and
    setting a purge done indicator based on the purge request not being a request to purge specific guest entries.

14. The computer system of claim 11, wherein the method further comprises:
    entering, by the hardware thread, Start Interpretative Execution (SIE) on the physical core;
    determining, based on entering SIE, whether a guest executing on the hardware thread last ran on a thread within the set of threads; and
    refraining, based on determining the guest last ran on a thread within the set of threads, from purging other guest entries of the structure associated with address translation.

15. The computer system of claim 11, wherein the purging on the at least multiple threads reduces purging to be performed on Start Interpretative Execution entry of the hardware thread.

16. A computer-implemented method of facilitating processing in a computing environment, said computer-implemented method comprising:
    issuing, by a physical thread of a physical core of a machine configuration, a purge request;
    determining, using a control of the purge request, whether the purge request is a local request; and
    purging, based on determining using the control of the purge request that the purge request is a local request, one or more entries of a structure associated with address translation on at least multiple hardware threads of a set of hardware threads of the machine configuration.

17. The computer-implemented method of claim 16, further comprising:
    checking, based on the purge request being a local request, whether a purge has already been performed on the hardware threads of the set of hardware threads except for the hardware thread issuing the purge request; and
    performing the purging, based on the checking indicating the purge has not already been performed.

18. The computer-implemented method of claim 17, further comprising:
    determining, based on performing the purging, whether the purge request is a request to purge specific guest entries; and
    setting a purge done indicator based on the purge request not being a request to purge specific guest entries.

19. The computer-implemented method of claim 16, wherein the method further comprises:
    entering, by the hardware thread, Start Interpretative Execution (SIE) on the physical core;
    determining, based on entering SIE, whether a guest executing on the hardware thread last ran on a thread within the set of threads; and
    refraining, based on determining the guest last ran on a thread within the set of threads, from purging guest entries of the structure associated with address translation.

20. The computer-implemented method of claim 16, wherein the purging on the at least multiple threads reduces purging to be performed on Start Interpretative Execution entry of the hardware thread.

* * * * *